(12) United States Patent
Nishikawa et al.

(10) Patent No.: US 7,368,488 B2
(45) Date of Patent: May 6, 2008

(54) CEMENT ADMIXTURE AND CEMENT ADMIXTURE COMPOSITE

(75) Inventors: Tomotaka Nishikawa, Osaka (JP); Tomiyasu Ueta, Osaka (JP); Hiromichi Tanaka, Kanagawa (JP); Minoru Miyagawa, Kanagawa (JP); Shogo Iwai, Kanagawa (JP)

(73) Assignee: Nippon Shokubai Co., Ltd., Osaka (JP)

( * ) Notice: Subject to any disclaimer, the term of this patent is extended or adjusted under 35 U.S.C. 154(b) by 15 days.

(21) Appl. No.: 10/555,955

(22) PCT Filed: May 7, 2004

(86) PCT No.: PCT/JP2004/006479

§ 371 (c)(1),
(2), (4) Date: Nov. 15, 2006

(87) PCT Pub. No.: WO2004/099100

PCT Pub. Date: Nov. 18, 2004

(65) Prior Publication Data

US 2007/0173568 A1    Jul. 26, 2007

(30) Foreign Application Priority Data

May 7, 2003  (JP) ............... 2003-128594
Oct. 3, 2003  (JP) ............... 2003-346161

(51) Int. Cl.
*C04B 24/26* (2006.01)

(52) U.S. Cl. ............... 524/5; 524/556; 524/560

(58) Field of Classification Search ............ 524/5, 524/556, 560
See application file for complete search history.

(56) References Cited

U.S. PATENT DOCUMENTS 6,258,162 B1 * 7/2001 Kawakami et al. ......... 106/810
6,358,310 B1 * 3/2002 Berke et al. .............. 106/802

FOREIGN PATENT DOCUMENTS

| JP | 06-279082 A | | 10/1994 |
|---|---|---|---|
| JP | 06279082 A | * | 10/1994 |
| JP | 07-126053 A | | 5/1995 |
| JP | 08165156 A | * | 6/1996 |
| JP | 09-248438 A | | 9/1997 |
| JP | 09227192 A | * | 9/1997 |
| JP | 10-194808 A | | 7/1998 |

* cited by examiner

*Primary Examiner*—David W. Wu
*Assistant Examiner*—Satya Sastri
(74) *Attorney, Agent, or Firm*—Connolly Bove Lodge and Hutz

(57) ABSTRACT

The cement admixture and the cement admixture composite of the present invention can improve the water-reducing ability of cement compositions and the like and enhance the strength and durability of hardening products produced therefrom and further can adjust the viscosity of such compositions so as to facilitate the works at the sites of handling the same. The above-mentioned cement admixture is a cement admixture comprising a polycarboxylic acid polymer containing a specific site, and the above-mentioned cement admixture composite comprises two or more species of cement admixtures, wherein at least one of them is said cement admixture.

3 Claims, No Drawings

CEMENT ADMIXTURE AND CEMENT ADMIXTURE COMPOSITE

This application is a National Stage of PCT/JP2004/006479 filed May 7, 2004 which in turn claims priority from Japanese Applications 2003-128594 filed May 7, 2003 and 2003-346161 filed Oct. 3, 2003, respectively.

TECHNICAL FIELD

The present invention relates to a cement admixture and a cement admixture composite. More particularly, it relates to a cement admixture and a cement admixture composite capable of exhibiting high water-reducing performance and, further, of providing cement compositions with excellent handling properties.

BACKGROUND ART

Cement admixtures comprising a polycarboxylic acid polymer have been widely used for cement compositions such as cement paste, mortar, and concrete. They are now essential in constructing civil engineering and building structures and the like from a cement composition. Such cement admixtures are used as a water reducing agent and the like. They increase the fluidity of cement compositions to thereby reduce the water requirement of the cement compositions and therefore are effective in improving the strength, durability, and the like, of hardening products. As such water reducing agents, polycarboxylic acid water reducing agents comprising polycarboxylic acid polymers as main component, which are superior in water-reducing performance to naphthalene and other conventional water reducing agents, have already led to good results in many cases as air-entraining and high-range water-reducing admixture.

However, cement admixtures are required to be able not only to show water-reducing performance in such cement compositions but also to improve cement compositions in viscosity to thereby facilitate the works at the sites of handling them. Thus, they are required at the sites of civil engineering and building structure construction not only to be able to show water-reducing performance but also to provide a viscosity in such the level that the works will be facilitated at the sites of handling them. If a cement admixture can exhibit such performance characteristics, it will improve the working efficiency in civil engineering and building structure construction.

With respect to such requirements, Japanese Kokai Publication Hei-09-248438 proposes a dispersant for decreasing the viscosity of hydraulic compositions such as cement. However, in construction sites, it is required to make cement compositions easier to be handled, and have improved basic performances. Thus, it has been asked for providing cement admixtures satisfying such requirements.

SUMMARY OF THE INVENTION

It is an object of the present invention, which has been made in view of the above-mentioned state of the art, to provide a cement admixture capable of improving the water-reducing ability of cement compositions and the like and enhancing the strength and durability of hardening products produced therefrom and further capable of adjusting the viscosity of such compositions so as to facilitate the works at the sites of handling the same, as well as a cement admixture composite.

In the course of investigations made by them in search of cement admixtures excellent in water-reducing ability and workability improvement, the present inventors first paid attention to the fact that a polycarboxylic acid polymer containing a polyethylene glycol chain can exhibit water-reducing performance characteristics to cement compositions and the like, and they found that the viscosity of cement compositions or the like is effectively improved by introducing an alkylene oxide site containing 3 or more carbon atoms into a middle position, which is a specified position of the polyethylene glycol chain, and thus have come to a conclusion that the above-mentioned problems can be solved by using the cement admixture. The present inventors have also found that mixing of two or more species of the above-mentioned cement admixtures with one another or mixing one or two or more species of the above-mentioned cement admixtures with one or two or more species of other cement admixtures provides mixtures containing cement admixtures with various characteristics of respective cement admixtures, thereby their abilities are sufficiently and efficiently exhibited, and finally have accomplished the present invention.

That is, the present invention relates to a cement admixture comprising a polycarboxylic acid polymer, wherein said polycarboxylic acid polymer has a site represented by the following formula (1):

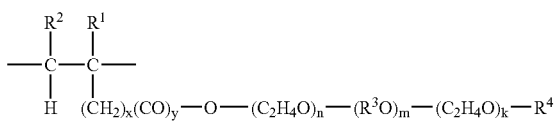

(wherein $R^1$ and $R^2$ may be the same or different and each represents a hydrogen atom or a methyl group; $R^3$ may be the same or different and represents an alkylene group containing 3 to 18 carbon atoms; x represents a number of 0 to 2; y represents 0 or 1; n and k represent an average molar number of addition of an oxyethylene group, in which n is a number of 1 to 200 and k is a number of 1 to 200; m represents an average molar number of addition of the oxyalkylene group and is a number of 1 to 50; n+m+k is a number of 3 to 200; and $R^4$ represents a hydrogen atom or a hydrocarbon group containing 1 to 20 carbon atoms).

The present invention also relates to a cement admixture composite comprising two or more species of cement admixtures, wherein at least one of the two or more species of cement admixtures is the cement admixture.

DISCLOSURE OF THE INVENTION

In the following, the present invention is described in detail.

The polycarboxylic acid polymer comprised in the cement admixture of the present invention is a polymer comprising two or more carboxylic acids or carboxylate salts in one molecule and into which a specific structure represented by the following formula (1) is introduced at a site (moiety) constituting the polymer:

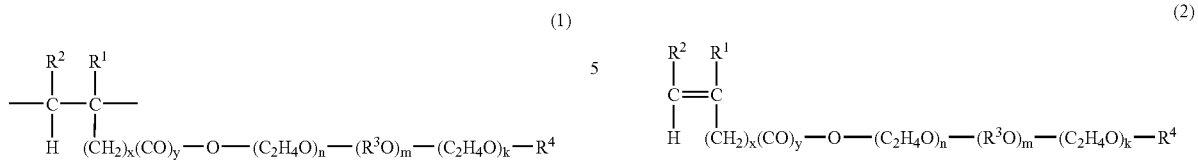

(wherein $R^1$ and $R^2$ may be the same or different and each represents a hydrogen atom or a methyl group; $R^3$ may be the same or different and represents an alkylene group containing 3 to 18 carbon atoms; x represents a number of 0 to 2; y represents 0 or 1; n and k represent an average molar number of addition of an oxyethylene group, in which n is a number of 1 to 200 and k is a number of 1 to 200; m represents an average molar number of addition of the oxyalkylene group and is a number of 1 to 50; n+m+k is a number of 3 to 200; and $R^4$ represents a hydrogen atom or a hydrocarbon group containing 1 to 20 carbon atoms).

The polyoxyalkylene chain represented by the repeating number of n, m and k in the above formula (1) is a form of so-called A-B-A block copolymer, and this specific structure is one of factors for excellent water-reducing ability and low viscosity. A is composed of oxyethylene with high hydrophilicity and B is composed of a hydrophobic oxyalkylene containing 3 to 18 carbon atoms, wherein the hydrophobic portion (the portion represented as B) exists inside the hydrophilic chain (the portions represented as A). The present invention is characterized in having a hydrophobic portion inside this hydrophilic chain, thereby exerts both water-reducing ability and low viscosity.

In the above-mentioned formula (1), n and k may be the same or different and each represents a number of 1 to 200. If they exceed 200, the viscosity increases and the workability may be deteriorated in some cases. Preferably, they are 1 to 60, and more preferably they are 1 to 20. m represents a number of 1 to 50, and if it exceeds 50, water-reducing ability may be deteriorated or hydrophobicity may increase in some cases to result in incompatibility with kneading water to be added to cement and inferior workability. The range of m is preferably 1 to 20, more preferably 1 to 5, and still more preferably 1 to 3. n+m+k, which is a sum of n, m and k, is a number of 3 to 200. When n+m+k exceeds 200, the viscosity becomes high, and workability may become poor. It is preferably a number of 5 to 120, more preferably a number of 5 to 100, and still more preferably a number of 5 to 50. $R^3$ may be the same or different and each represents an alkylene group containing 3 to 18 carbon atoms, and it preferably represents 2-methylethylene group (generally, propylene oxide is a precursor) containing 3 carbon atoms. $R^4$ represents a hydrogen atom or hydrocarbon group containing 1 to 20 hydrocarbon atoms, and it preferably represents a methyl group.

The polycarboxylic acid polymer essentially comprised in the present invention can be obtained by polymerizing, for example, one or two or more species of monomers having a carboxylic acid or a carboxylate salt and a polymerizable double bond in one molecule and one or two or more species of monomers represented by the following formula (2):

(wherein $R^1$ and $R^2$ may be the same or different and each represents a hydrogen atom or a methyl group; $R^3$ may be the same or different and represents an alkylene group containing 3 to 18 carbon atoms; x represents a number of 0 to 2; y represents 0 or 1; n and k represent an average molar number of addition of an oxyethylene group, in which n is a number of 1 to 200 and k is a number of 1 to 200; m represents an average molar number of addition of the oxyalkylene group and is a number of 1 to 50; n+m+k is a number of 3 to 200; and $R^4$ represents a hydrogen atom or a hydrocarbon group containing 1 to 20 carbon atoms). In the case where a carboxylate salt is used, for example, an alkali metal salt, an alkaline earth metal salt or an ammonium salt can be used, and the above polycarboxylic acid polymer may be obtained by polymerizing these carboxylate salts, or by forming a salt after polymerizing carboxylic acid monomers.

The monomer represented by the above-mentioned formula (2) can be obtained by adding ethylene oxide in a proper amount so as to give the prescribed repeating number to an unsaturated alcohol or an unsaturated carboxylic acid; adding alkylene oxide containing 3 to 18 carbon atoms in a proper amount so as to give the prescribed repeating number; and adding ethylene oxide in a proper amount so as to give the prescribed repeating number. Furthermore, the monomer can also be obtained by esterification of an alcohol, which is obtained by adding ethylene oxide in a proper amount so as to give the prescribed repeating number to an alcohol or a phenol comprising a hydrocarbon group containing 1 to 20 carbon atoms, adding alkylene oxide of 3 to 18 carbon atoms in a proper amount so as to give the prescribed repeating number, and adding ethylene oxide in a proper amount so as to give the prescribed repeating number, with an unsaturated carboxylic acid or ester exchange reaction of the alcohol with an unsaturated carboxylic acid ester.

The analytical technique of the copolymer in the present invention (side chain; for example, the side chain of (ethylene oxide)-(alkylene oxide containing 3 to 18 carbon atoms)-(ethylene oxide) in the above formula (1) and (2)) can be specified by combining nuclear magnetic resonance spectrometry (H-NMR and C-NMR, etc.), gas chromatography-mass spectrometry (GC-MS), liquid chromatography-mass spectrometry (LC-MS), capillary electrophoresis and other various analysis.

As the above-mentioned unsaturated alcohols, there may be mentioned vinyl alcohol, allyl alcohol, methallyl alcohol, 3-buten-1-ol, 3-methyl-3-buten-1-ol, 3-methyl-2-buten-1-ol, 2-methyl-3-buten-2-ol, 2-methyl-2-buten-1-ol and 2-methyl-3-buten-1-ol, and like like. As the above-mentioned unsaturated carboxylic acid, there may be mentioned acrylic acid and methacrylic acid and the like, and alkyl esters of these unsaturated carboxylic acids may be used in the above-mentioned unsaturated carboxylic acid ester. As the alkylene oxide containing 3 to 18 carbon atoms, there may be mentioned propylene oxide, butylene oxide, epoxy compound of unsaturated hydrocarbon and the like, and among them, propylene oxide is preferred. Preferred as the alcohol or phenols comprising a hydrocarbon group containing 1 to 20 carbon atoms are alkyl alcohols such as methanol, ethanol and butanol; alcohols having an aryl group such as benzyl alcohol; phenols such as phenol and para-methyl phenol and the like. Preferred among them are alcohols containing 1 to 3 carbon atoms such as methanol, ethanol and butanol.

Suited as the monomer having a carboxylic acid or a carboxylate salt and a polymerizable double bond in one molecule, which is copolymerizable with the monomer represented by the above formula (2) is, for example, a monomer represented by the following formula (3):

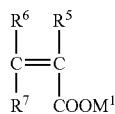

(3)

(wherein $R^5$, $R^6$ and $R^7$ may be the same or different and each represents a hydrogen atom, a methyl group, or a group represented by $—(CH_2)_zCOOM^2$, and Z is a number of 0 to 2. The group represented by $—(CH_2)_zCOOM^2$ may form an anhydride with $—COOM^1$ or the other group represented by $—(CH_2)_zCOOM^2$; $M^1$ and $M^2$ may be the same or different and each represents a hydrogen atom, a metal atom, an ammonium group or an organic amine group (an organic ammonium group)). As such monomers, there may be mentioned an unsaturated monocarboxylic acid monomer, an unsaturated dicarboxylic acid monomer and the like.

Suitable as the metal atom in $M^1$ and $M^2$ in the above formula (3) are univalent metal atoms, for example alkali metal atoms such as lithium, sodium and potassium; bivalent metal atoms, for example alkaline earth metal atoms such as calcium and magnesium; and trivalent metal atoms such as aluminum and iron. Suitable as the organic amine group (organic ammonium group), there may be mentioned, alkanolamine groups (alkanolammonium group) such as an ethanolamine group (ethanolammonium group), diethanolamine group (diethanolammonium group) and triethanolamine group (triethanolammonium group), and triethylamine group (triethylammonium group). Further, it may be an ammonium group.

As the monomer represented by the formula (3), there may be mentioned acrylic acid, methacrylic acid, crotonic acid, maleic acid, itaconic acid, citriconic acid, fumaric acid and the like; monovalent metal salts, divalent metal salts, ammonium salts and organic ammonium salts thereof, and so forth. Among these, methacrylic acid; monovalent metal salts, divalent metal salts, ammonium salts and organic amine salts (organic ammonium salts) thereof and the like are preferably used from the viewpoint of improved cement dispersing ability (dispersibility).

The mass ratio of the site represented by the formula (1) relative to the total mass of the above-mentioned polycarboxylic acid polymer is preferably 10 to 95% by mass. More preferably, it is 50 to 90% by mass, and still more preferably 65 to 85% by mass. In cases where the above-mentioned polycarboxylic acid polymer is obtained by copolymerizing the monomer (a) represented by the above formula (2) and the the monomer (b) represented by the above formula (3), (a) is preferably 10 to 95% by mass relative to 100% by mass of the total mass of monomers (a) and (b). More preferably, it is 50 to 90% by mass, and still more preferably 65 to 85% by mass. The monomer components containing the monomer (a) and (b) may further contain another monomer, as the copolymerizable component, the amount of such monomer is 0 to 50% by mass relative to 100% by mass of the total mass of (a) and (b). Suitable as another monomer(s) other than the monomer (a) and (b) are, for example, styrene, (meth)acrylic acid esters, acrylonitrile, acrylamide, (meth) allylsulfonate, 2-(meth)acryloxyethylsulfonate, 3-(meth) acryloxypropylsulfonate, 3-(meth)acryloxy-2-hydroxypropylsulfonate, 3-(meth)acryloxy-2-hydroxypropylsulfophenyl ether, 3-(meth)acryloxy-2-hydroxypropyloxysulfobenzoate, 4-(meth) acryloxybutylsulfonate, (meth)acrylamidomethylsulfonic acid, (meth)acrylamidoethylsulfonic acid, and 2-methylpropanesulfonic acid (meth)acrylamide. These monomers may be used singly or two or more of them may be used in combination.

The above-mentioned polycarboxylic acid polymer can be obtained by polymerizing these monomers. As a polymerization method, known methods can be used such as aqueous solution polymerization, polymerization in organic solvents, emulsion polymerization, or bulk polymerization using a polymerization initiator and optionally a chain transfer agent. As the polymerization initiator, the known ones can be used. It is also possible to combinedly use persulfate salts such as ammonium persulfate, sodium persulfate and potassium persulfate; hydrogen peroxide; azo compounds such as azobis-2-methylpropionamidine hydrochloride and azoisobutyronitrile; peroxides such as benzoyl peroxide, lauroyl peroxide and cumene hydroperoxide; and so forth. Further, as the promoter, reducing agents such as sodium hydrogensulfite, sodium sulfite, Mohr's salt, sodium pyrobisulfite, formaldehyde sodium sulfoxylate, ascorbic acid and erythorbic acid; and amine compounds such as ethylenediamine, sodium ethylenediaminetetraacetate and glycine, etc. can be used in combination. These polymerization initiators and promoters may be used singly or two or more species may be used in combination.

In the above polymerization method, a chain transfer agent may be used according to need. Usable as such chain transfer agent are one or two or more species of those known in the art. Suitable as the above hydrophobic chain transfer agent are thiol compounds having a hydrocarbon group containing not less than 3 carbon atoms or compounds whose solubility in water at 25° C. is not more than 10%. For example, there may be mentioned thiol chain transfer agents such as butanethiol, octanethiol, decanethiol, dodecanethiol, hexadecanethiol, octadecanethiol, cyclohexyl mercaptan, thiophenol, octyl thioglycolate, octyl 2-mercaptopropionate, octyl 3-mercaptopropionate, 2-ethylhexyl mercaptopropionate, 2-mercaptoethyl octanoate, 1,8-dimercapto-3,6-dioxaoctane, decanetrithiol and dodecyl mercaptan; halides such as carbon tetrachloride, carbon tetrabromide, methylene chloride, bromoform and bromotrichloroethane; and unsaturated hydrocarbon compounds such as α-methylstyrene dimer, α-terpinene, γ-terpinene, dipentene and terpinolene. These may be used singly or two or more species may be used in combination. Moreover, as a hydrophobic chain transfer agent, there may be mentioned thiol chain transfer agents such as mercaptoethanol, thioglycerol, thioglycolic acid, mercaptopropionic acid, 2-mercaptopropionic acid, 3-mercaptopropionic acid, thiomalic acid, and 2-mercaptoethanesulfonic acid; primary alcohols such as 2-aminopropane-1-ol; secondary alcohols such as isopropanol; phosphorous acid, hypophosphorous acid and salts thereof (e.g. sodium hypophosphite, potassium hypophosphite), sulfurous acid, hydrosulfurous acid, dithionous acid, metabisulfurous acid, and salts thereof (e.g. sodium sulfite, sodium hydrogen sulfite, sodium dithionite, sodium metabisulfite, potassium sulfite, potassium hydrogen sulfite, potassium dithionite, potassium metabisulfite), and like lower oxides and salts thereof. These may be used singly or two or more of them may be used in combination.

As for the method of adding the above chain transfer agent to the reaction vessel, such a continuous charging method as dripping and divided charging can be applied. The chain transfer agent may be introduced singly into the reaction vessel, or it may be admixed in advance with the monomer or solvent and/or the like.

The above polymerization may be carried out either batchwise or continuously. As the solvent which is used where necessary in the step of polymerization, any of known ones may be used and there may be mentioned water; alcohols such as methyl alcohol, ethyl alcohol and isopropyl alcohol; aromatic or aliphatic hydrocarbons such as benzene, toluene, xylene, cyclohexane and n-heptane; esters such as ethyl acetate; and ketones such as acetone and methyl ethyl ketone. These may be used singly or two or more species may be used in combination. Among them, one or two or more solvents selected from the group consisting of water and lower alcohols containing 1 to 4 carbon atoms are. preferably used from the viewpoint of solubility of the monomer components and the product polycarboxylic acid polymer.

As for the method of adding the monomers, polymerization initiator, etc. to the reaction vessel in the above-mentioned polymerization method, the method comprising charging the reaction vessel with all monomers and then adding the polymerization initiator thereto to conduct (co) polymerization; the method comprising charging the reaction vessel with some of monomers and then adding the polymerization initiator and residual monomers thereto to conduct polymerization; and the method comprising charging the reaction vessel with the polymerization solvent and then adding the whole amount of the monomers and polymerization initiator thereto are suitable.

Among such methods, the method comprising carrying out the polymerization by adding the polymerization initiator and monomers dropwise successively to the reaction vessel is preferred since the molecular weight distribution of the product polymer can be made narrow (sharp) and the cement dispersing ability for increasing the fluidity of cement compositions and the like can be improved thereby. Furthermore, the (co)polymerization reaction is preferably carried out with maintaining the concentration of a solvent in the reaction vessel during the polymerization to not more than 50% since the preservation stability of the obtained polymer is more improved by the improvement of the polymerizability of the monomers. More preferably, it is not more than 40%, still more preferably not more than 30%.

In the above method of polymerization, the polymerization temperature and other polymerization conditions are appropriately selected according to the polymerization method, solvent, polymerization initiator, and chain transfer agent employed. Generally, the polymerization temperature is preferably not lower than 0° C. and not higher than 150° C. More preferably, it is in the range of 40 to 120° C., still more preferably 50 to 100° C., and especially preferably 60 to 85° C.

The polymer obtained by the above method of polymerization as such can be used as the main component of cement admixtures. Where necessary, it may be used after further neutralization with an alkaline substance. Preferably used as the alkaline substance are inorganic salts such as monovalent and divalent metal hydroxides, chlorides and carbonates; ammonia; and organic amines.

As for the weight average molecular weight of the polycarboxylic acid polymer of the present invention, the weight average molecular weight (Mw) as determined by gel permeation chromatography (hereinafter referred to as. "GPC") and expressed on the polyethylene glycol equivalent basis is preferably 3000 to 100000. More preferably, it is 5000 to 80000, and still more preferably 7000 to 40000.

(GPC Molecular Weight Measurement Conditions)
Column used: Tosoh TSK guard column SWXL+TSK gel G4000SWXL+G3000SWXL+G2000SWXL
Eluent: Sodium acetate trihydrate (115.6 g) is dissolved in a mixed solvent composed of 10999 g of water and 6001 g of acetonitrile, and the solution is further adjusted to pH 6.0 with acetic acid and used as the solution of the eluent.
Injection volume: 100 μL of the 0.5% solution of the eluent
Eluent flow rate: 0.8 mL/min
Column temperature: 40° C.
Standard samples: Polyethylene glycol, peak-top molecular weights (Mp) 272500, 219300, 85000, 46000, 24000, 12600, 4250, 7100, 1470
Order of Calibration curve: 3rd-order
Detector: Waters, Japan's 410 differential refractive index detector
Analysis software: Waters, Japan's MILLENNIUM Ver. 3.21

The cement admixture of the present invention comprises the polycarboxylic acid polymer obtained by the above-mentioned method, and is preferably in the state of an aqueous solution in view of handling property. The cement admixture of the present invention may also contain other additives. It is allowable to add the additives when the cement admixture is mixed with cement. As said other cement additives, those known other cement additives (ingredients) shown below may be used.

(a) Water-soluble macromolecular substances; unsaturated carboxylic acid polymers such as polyacrylic acid (sodium salt), polymethacrylic acid (sodium salt), polymaleic acid (sodium salt) and acrylic acid-maleic acid copolymer sodium salt; polyoxyethylene or polyoxypropylene polymers or copolymers thereof, such as polyethylene glycol and polypropylene glycol; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharides produced by microbial fermentation, such as yeast glucans, xanthan gum, β-1,3-glucans (which may be straight chained or branched; e.g. curdlan, paramylum, pachyman, scleroglucan, laminaran); polyacrylamide; polyvinyl alcohol; starch; starch phosphate; sodium alginate; gelatin; amino-containing acrylic acid copolymers and quaternization products derived therefrom; and the like;

(b) Polymer emulsions; copolymers of various vinyl monomers such as alkyl (meth)acrylates; and the like;

(c) Retarders; oxycarboxylic acids (or salts thereof) and inorganic or organic salts, such as gluconic acid, glucoheptonic acid, arabonic acid, malic acid and citric acid, and sodium, potassium, calcium, magnesium, ammonium and triethanolamine salts thereof; saccharides, for example monosaccharides, disaccharides, trisaccharides and like oligosaccharides, such as glucose, fructose, galactose, saccharose, xylose, apiose, ribose and isomerized saccharide, oligosaccharides such as dextrin, polysaccharides such as dextran, molasses and like mixtures containing these; sugar alcohols such as sorbitol; magnesium fluorosilicate; phosphoric acid and salts thereof or borate esters; aminocarboxylic acids and salts thereof; alkali-soluble proteins; humic acid; tannic acid; phenols; polyhydric alcohols such as glycerol; phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta(methylenephosphonic acid) and alkali metal salts and alkaline earth metal salts of these; and the like;

(d) High-early-strength agents or accelerators; soluble calcium salts such as calcium chloride, calcium nitrite, calcium nitrate, calcium bromide and calcium iodide; chlorides such as iron chloride and magnesium chloride; sulfate salts; potassium hydroxide; sodium hydroxide; carbonate salts; thiosulfate salts; formic acid and formate salts such as calcium formate; alkanolamines; alumina cement; calcium aluminosilicate; and the like;

(e) Mineral oil antifoaming agents; kerosene, liquid paraffin, etc.;

(f) Fat or oil antifoaming agents; animal/vegetable oils, sesame oil, castor oil, alkylene oxide adducts derived from these, and the like;

(g) Fatty acid antifoaming agents; oleic acid, stearic acid, alkylene oxide adducts derived from these, and the like;

(h) Fatty acid ester antifoaming agents; glycerin monoricinolate, alkenylsuccinic acid derivatives, sorbitol monolaurate, sorbitol trioleate, natural waxes, etc.;

(i) Oxyalkylene antifoaming agents; polyoxyalkylenes such as (poly)oxyethylene-(poly)oxypropylene adducts; (poly)oxyalkyl ethers such as diethylene glycol heptyl ether, polyoxyethylene oleyl ether, polyoxypropylene butyl ether, polyoxyethylene-polyoxypropylene 2-ethylhexyl ether and oxyethylene-oxypropylene adducts of higher alcohols containing 12 to 14 carbon atoms; (poly)oxyalkylene (alkyl)aryl ethers such as polyoxypropylene phenyl ether and polyoxyethylene nonylphenyl ether; acetylene ethers derived from acetylene alcohol by addition polymerization of an alkylene oxide, such as 2,4,7,9-tetramethyl-5-decyne-4,7-diol, 2,5-dimethyl-3-hexyne-2,5-diol and 3-methyl-1-butyn-3-ol; (poly)oxyalkylene fatty acid esters such as diethylene glycol oleate, diethylene glycol laurate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl) ether sulfate ester salts such as sodium polyoxypropylenemethyl ether sulfate and sodium polyoxyethylene dodecylphenol ether sulfate; (poly)oxyalkylenealkyl phosphate esters such as (poly)oxyethylenestearyl phosphate; (poly)oxyalkylenealkylamines such as polyoxyethylenelaurylamine; polyoxyalkyleneamides; etc.;

(j) Alcohol antifoaming agents; octyl alcohol, hexadecyl alcohol, acetylene alcohol, glycols, etc.;

(k) Amide antifoaming agents; acrylate polyamines etc.;

(l) Phosphate ester antifoaming agents; tributyl phosphate, sodium octyl phosphate, etc.;

(m) Metal soap antifoaming agents; aluminum stearate, calcium oleate, etc.;

(n) Silicone antifoaming agents; dimethylsilicone oils, silicone pastes, silicone emulsions, organic modified polysiloxanes (polyorganosiloxanes such as dimethylpolysiloxane), fluorosilicone oils, etc.;

(o) AE (air-entraining) agents; resin soaps, saturated or unsaturated fatty acids, sodium hydroxystearate, lauryl sulfate, ABS (alkylbenzenesulfonates), LAS (linear alkylbenzenesulfonates), alkanesulfonates, polyoxyethylene alkyl(phenyl) ethers, polyoxyethylene alkyl(phenyl) ether sulfates and salts thereof, polyoxyethylene alkyl(phenyl) ether phosphates and salts thereof, proteinous materials, alkenylsulfosuccinic acids, $\alpha$-olefinsulfonates, etc.;

(p) Other surfactants; polyalkylene oxide derivatives produced by addition of not less than 10 moles of an alkylene oxide, such as ethylene oxide and/or propylene oxide to monohydric aliphatic alcohol containing 6 to 30 carbon atoms, such as octadecyl alcohol or stearyl alcohol, a monhydric alicyclic alcohol containing 6 to 30 carbon atoms, such as abietyl alcohol, a monomercaptan containing 6 to 30 carbon atoms, such as dodecyl mercaptan, an alkylphenol containing 6 to 30 carbon atoms, such as nonylphenol, an amine containing 6 to 30 carbon atoms, such as dodecylamine, or a carboxylic acid containing 6 to 30 carbon atoms, such as lauric acid or stearic acid; alkyl diphenyl ether sulfonate salts containing two sulfo-containing phenyl groups, which may have an alkyl or alkoxy group as a substituent, bound together by ether bonding; various anionic surfactants, various cationic surfactants such as alkylamine acetates and alkyltrimethylammonium chlorides; various nonionic surfactants; various amphoteric surfactants; and the like;

(q) Water-proof agents; fatty acids (salts), fatty acid esters, fats and oils, silicones, paraffins, asphalts, waxes, etc.;

(r) Corrosion inhibitors; nitrite salts, phosphate salts, zinc oxide, etc.;

(s) Crack inhibitors; polyoxyalkyl ethers; alkanediols such as 2-methyl-2,4-pentanediol; etc.;

(t) Expansive additives; ettringite materials, coals, etc.

As other known cement additives (ingredients), there may be mentioned cement wetting agents, thickening agents, segregation inhibitors, flocculants, agents to reduce drying shrinkage, agents to increase strength, self-leveling agents, corrosion inhibitors, color difference agents, antifungal agents, blast-furnace slag, fly ash, cinder ash, clinker ash, husk ash, silica fume, silica powder, gypsum and so forth. These known cement additives (ingredients) may be used singly or two or more of them may be used in combination.

In addition, the cement admixture of the present invention can be used in combinations with any of those cement dispersants that are in general use and well known in the art. As the above cement dispersants, the following are suitable.

Ligninsulfonates; polyol derivatives; naphthalenesulfonic acid-formaline condensates; melaminesulfonic acid-formaline condensates; polystyrenesulfonic acid salts; aminosulfonic acid compounds such as aminoarylsulfonic acid-phenol-formaldehyde condensates as described in Japanese Kokai Publication Hei-01-113419; cement dispersants comprising, as component (a), a copolymer of a polyalkylene glycol mono(meth)acrylate compound and a (meth)acrylic acid compound and/or a salt of said copolymer, as component (b), a copolymer of a polyalkylene glycol mono(meth)allyl ether compound and maleic anhydride and/or a hydrolyzate of said copolymer and/or a salt thereof and, as component (c), a copolymer of a polyalkylene glycol mono(meth)allyl ether compound and a maleic acid ester of a polyalkylene glycol compound, and/or a salt thereof, as described in Japanese Kokai Publication Hei-07-267705; concrete admixtures comprising, as component A, a copolymer of a polyalkylene glycol (meth)acrylate and (meth)acrylic acid (or a salt thereof), as component B, a specific polyethylene glycol-polypropylene glycol compound and, as component C, a specific surfactant, as described in Japanese Patent No. 2508113; copolymers of polyethylene (propylene) glycol (meth)acrylate or polyethylene(propylene) glycol mono(meth)allyl ether, (meth)allylsulfonic acid (or a salt thereof) and (meth)acrylic acid (or a salt thereof), as described in Japanese Kokai Publication Sho-62-216950; copolymers of polyethylene (propylene) glycol (meth) acrylate, (meth)allylsulfonic acid (or a salt thereof) and (meth)acrylic acid (or a salt thereof), as described in Japanese Kokai Publication Hei-01-226757; copolymers of polyethylene(propylene) glycol (meth)acrylate, (meth)allylsulfonic acid (or a salt thereof) or p-(meth)allyloxybenzenesulfonic acid (or a salt thereof) and (meth) acrylic acid (or a salt thereof), as described in Japanese Kokoku Publication Hei-05-36377; copolymers of polyethylene glycol mono(meth)allyl ether and maleic acid (or a salt thereof), as described in Japanese Kokai Publication Hei-04-149056; copolymers of polyethylene glycol (meth)acrylate, (meth)allylsulfonic acid (or a salt thereof), (meth) acrylic acid (or a salt thereof), an alkanediol mono(meth) acrylate, a polyalkylene glycol mono(meth)acrylate and an α, β-unsaturated monomer having an amide group within the molecule, as described in Japanese Kokai Publication Hei-05-170501; copolymers of polyethylene glycol mono (meth)allyl ether, polyethylene glycol mono(meth)acrylate, an alkyl (meth)acrylate, (meth)acrylic acid (or a salt thereof) and (meth)allylsulfonic acid (or a salt thereof) or p-(meth) allyloxybenzenesulfonic acid (or a salt thereof), as described in Japanese Kokai Publication H06-191918; copolymers of an alkoxypolyalkylene glycol monoallyl ether and maleic anhydride, or hydrolyzates thereof, or salts thereof, as described in Japanese Kokai Publication Hei-05-43288; copolymers of polyethylene glycol monoallyl ether, maleic acid and a monomer copolymerizable with these monomers, or salts thereof, or esters thereof, as described in Japanese Kokoku Publication Sho-58-38380;

copolymers of a polyalkylene glycol mono(meth)acrylate monomer, a (meth)acrylic acid monomer and a monomer copolymerizable with these monomers, as described in Japanese Kokoku Publication Sho-59-18338; copolymers of a (meth)acrylic acid ester having a sulfonic acid group and a monomer coplymerizable with these as necessary, or salts thereof, as described in Japanese Kokai Publication Sho-62-119147; esterification reaction products from a copolymer of an alkoxypolyalkylene glycol monoallyl ether and maleic anhydride and an alkenyl-terminated polyoxyalkylene derivative, as described in Japanese Kokai Publication Hei-06-271347; esterification reaction products from a copolymer of an alkoxypolyalkylene glycol monoallyl ether and maleic anhydride and a hydroxy-terminated polyoxyalkylene derivative, as described in Japanese Kokai Publication Hei-06-298555; copolymers of alkenyl ether monomer obtained by addition of an ethylene oxide to a specific unsaturated alcohol, such as 3-methyl-3-buten-1-ol, an unsaturated carboxylic acid monomer and a monomer copolymerizable with these, or salts thereof as described in Japanese Kokai Publication Sho-62-68806 or like polycarboxylic acids (or salts thereof). These cement dispersants may be used singly or two or more of them may be used in combination.

The present invention also relates to a cement admixture composite comprising two or more species of cement admixtures, wherein at least one of the two or more species of cement admixtures is the cement admixture of the present invention.

The above-mentioned cement admixture composite become to have various characteristic properties of the cement admixtures blended; therefore, the addition to cement compositions leads to improvement in water-reducing ability of cement compositions and to increased strength and durability of hardened products obtained therefrom and, further provide a level of viscosity as facilitating the works on the sites of handling them. Such a cement admixture composite may be formed into a mixture by mixing (blending) the cement admixture prior to addition to cement compositions or the like. Alternatively, the cement admixture may be added separately to cement compositions or the like and thus formed into a mixture in the cement compositions.

The above-mentioned cement admixture composite may be in the form of a mixture in which the above-mentioned cement admixture of the present invention and other cement admixture are mixed. The examples thereof include (I) a mixture comprising two or more species of the cement admixture of the present invention, and (II) a mixture comprising one or two or more species of the cement admixture of the present invention and one or two or more species of cement admixtures other than the present invention.

In the embodiment of (I) or (II) mentioned above, in the case where two or more species of the cement admixtures of the present invention are contained, two or more species of polycarboxylic acid polymers having the site represented by the above-mentioned formula (1) with different alkylene oxide chain length or different copolymer compositions are contained.

In addition, as the method for separating polycarboxylic acid polymer, cloud point-separation, gel permeation chromatography (GPC)-preparation, liquid chromatography (LC)-preparation, capillary electrophoresis, and dialysis process and the like are exemplified, and polycarboxylic acid polymer can be separated by combining these methods suitably.

In the embodiment of (II), the mixing ratio (in terms of solid matters) of the cement admixture of the present invention is preferably 0.1% by mass as the lower limit relative to 100% by mass of the solid matters of the entire polymers in the cement admixture. More preferably, the lower limit value is 1% by mass, still more preferably, 5% by mass, and especially preferably 10% by mass. On the other hand, the upper limit value is preferably 99.9% by mass, more preferably 70% by mass, still more preferably 60% by mass, and especially preferably 50%., by mass.

In the above-mentioned embodiment (II), the cement admixture other than the cement admixture of the present invention in the cement admixture composite preferably comprises a polymer, which is composed of monomer components containing a polyalkylene glycol unsaturated monomer. Preferably it comprises a polymer having a site represented by the following formula (4):

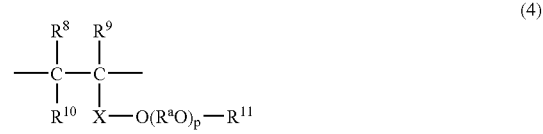

(wherein $R^8$, $R^9$ and $R^{10}$ may be the same or different and each represents a hydrogen atom or a methyl group; $R^{11}$ represents a hydrogen atom or a hydrocarbon group containing 1 to 30 carbon atoms; $R^a$ may be the same or different and represents an alkylene group containing 2 to 18 carbon atoms; p represents an average molar number of addition of the oxyalkylene group and is a number of 1 to 300; X represents a divalent alkylene group containing 1 to 5 carbon atoms, a —CO— bond, a —$R^b$—CO— bond, or a direct bond; and $R^b$ represents a divalent alkylene group containing 1 to 5 carbon atoms). In the case where X represents a direct bond, a carbon atom and an oxygen atom bonded to X are directly bonded to each other. Furthermore, also preferred is an embodiment in which a polymer having a nitrogen atom or a polymer containing a branched structure and an oxyalkylene group is comprised.

That is, the cement admixture in the cement admixture composite of the present invention preferably comprises at least one species of polymer selected from the group consisting of a polymer containing a site represented by the following formula (4), a polymer having a nitrogen atom, and a polymer containing a branched structure and an oxyalkylene group. These polymers and raw materials for producing thereof may be used singly or two or more of them may be used in combination.

The above-mentioned polymer composed of monomer components essentially containing the polyalkylene glycol unsaturated monomer may be any polymer obtained by polymerizing monomer components comprising the polyalkylene glycol unsaturated monomer. And said polyalkylene glycol unsaturated monomer is preferably a monomer represented by the following formula (5):

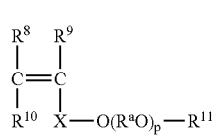

(5)

(wherein $R^8$, $R^9$ and $R^{10}$ may be the same or different and each represents a hydrogen atom or a methyl group; $R^{11}$ represents a hydrogen atom or a hydrocarbon group containing 1 to 30 carbon atoms; $R^a$ may be the same or different and each represents an alkylene group containing 2 to 18 carbon atoms, and p represents the average molar number of addition of the oxyalkylene group and is a number of 1 to 300; X represents an alkylene group containing 1 to 5 carbon atoms, a —CO— bond, an —$R^b$—CO— bond, or a direct bond, in case that X represents a direct bond, the carbon atom and oxygen atom bonded to X are directly bound to each other; $R^b$ represents a divalent alkylene group containing 1 to 5 carbon atoms). In addition, the polymer is preferable to contain an unsaturated carboxylic acid monomer as the monomer component, and it may optionally contain other copolymerizable monomer.

Furthermore, $R^8$, $R^9$, $R^{10}$, $R^{11}$, $R^a$, $R^b$, p and X in the formula (5) are the same as mentioned above in the formula (4).

The content ratio of the polyalkylene glycol unsaturated monomer and the unsaturated carboxylic acid monomer in the above-mentioned monomer components is preferably not less than 0.1 and not more than 2 on the basis of (polyalkylene glycol unsaturated monomer)/(unsaturated carboxylic acid monomer) (mole ratio). More preferably, it is not less than 0.3 and not more than 1.2.

The weight average molecular weight of the polymer composed of monomer components essentially containing the polyalkylene glycol unsaturated monomer is preferably not less than 1000 as determined by GPC and expressed on the polyethylene glycol equivalent basis. It is more preferably not less than 3000, still more preferably not less than 5000, and especially preferably not less than 7000. On the other hand, it is preferably not more than 500000. It is more preferably not more than 300000, still more preferably not more than 100000, and especially preferably not more than 80000. When the weight average molecular weight is less than 1000, or when it is more than 500000, dispersing ability may be decreased.

The above-mentioned unsaturated carboxylic monomer is preferably a monomer having a carboxylic acid or a carboxylate salt and a polymerizable double bond in one molecule as described above. In addition to these, also suitable as the unsaturated carboxylic acid monomer are half ester of unsaturated dicarboxylic acid monomer with an alcohol containing 1 to 22 carbon atoms, half amides of unsaturated dicarboxylic acid with an amine containing 1 to 22 carbon atoms, half ester of unsaturated dicarboxylic acid monomer with a glycol containing 2 to 4 carbon atoms, and half amide of maleamic acid with glycol containing 2 to 4 carbon atoms, and so forth.

The above-mentioned polyalkylene glycol unsaturated monomer is preferably the monomer represented by the formula (5) as described above, and for example, an unsaturated alcohol-polyalkylene glycol adduct and a polyalkylene glycol ester monomer is preferred. The unsaturated alcohol-polyalkylene glycol adduct may be a compound having a structure such that a polyalkylene glycol chain is added to an alcohol having an unsaturated group. The polyalkylene glycol ester monomer may be any of those monomers that have a structure in which an unsaturated group is bonded to a polyalkylene glycol chain via an ester bond, suited are unsaturated carboxylic acid polyalkylene glycol ester compound, in particular (alkoxy)polyalkylene glycol mono(meth)acrylic ester.

In cases where two or more oxyalkylene group species represented by —($R^aO$)— in the above formula (5) occur in one and the same monomer, the oxyalkylene groups represented by —($R^aO$)— may be in any addition mode, namely random addition, block addition, alternate addition or the like.

The oxyalkylene group(s) represented by —($R^aO$)— as mentioned above is an alkylene oxide adduct containing 2 to 18 carbon atoms. Such alkylene oxide adduct has a structure formed by one or two or more of alkylene oxides such as ethylene oxide, propylene oxide, butylene oxide, isobutylene oxide, 1-butene oxide and 2-butene oxide. Among such alkylene oxide adducts, ethylene oxide, propylene oxide and butylene oxide adducts are preferred. Still more preferably, it is mainly formed of ethylene oxides. That is, it is preferably a group mainly formed of an oxyethylene group(s). In this case, "mainly" means that the oxyethylene group accounts for a majority relative to the number of all the oxyalkylene groups occurring. When the oxyethylene group accounts for "a majority", in the above sense, of the above oxyalkylene groups, the proportion thereof as expressed in terms of mole % (mole percent) relative to 100 mole % of all the oxyalkylene groups is preferably 50 to 100 mole %. If it is less than 50 mole %, the hydrophilicity of the oxyalkylene groups may possibly decrease. More preferably, it is not less than 60 mole %, still more preferably not less than 70 mole %, especially preferably not less than 80 mole %, and most preferably not less than 90 mole %.

The average molar number p of addition of the oxyalkylene group represented by the above $R^aO$ is a number of 1 to 300. When p exceeds 300, the polymerizability of the monomer may decrease. A preferred range of p is not less than 2 and, in —($R^aO$)$_p$—, the average molar number of addition of the oxyetylene group(s) is preferably not less than 2. When p is less than 2 or the average molar number of addition of the oxyetylene group(s) is less than 2, sufficient levels of hydrophilicity and steric hindrance to disperse cement particles or the like may not be obtained, hence it may be impossible to obtain excellent fluidity. To obtain excellent fluidity, a preferred range of p is not less than 3 but not more than 280. More preferably, p is not less than 5, still more preferably not less than 10, especially preferably not less than 20. On the other hand, p is more preferably not more than 250, especially preferably not more than 150. As for the average molar number of addition of the oxyetylene group(s), it is preferably not less than 3 but not more than 280. More preferably, it is not less than 10, still more preferably not less than 20. On the other hand, it is more preferably not more than 250, still more preferably not more than 200, especially preferably not more than 150. The average molar number of addition means the average value for the molar number of the oxyalkylene group in question added in each mole of the group formed by the oxyalkylene group(s). For preparing concrete low in viscosity, as for the range of p, it is preferably not less than 3 but not more than 100, more preferably not less than 4 but not more than 50, still more preferably not less than 4 but not more than 30, most preferably not less than 5 but not more than 25.

It is possible to use, as the monomer represented by the formula (5), a combination of two or more monomer species differing in the average molar number p of addition of the oxyalkylene group(s). As a suitable combination, for example, a combination of two monomer species differing in the average molar number p of addition by not more than 10 (preferably a difference in p by not more than 5), a combination of two monomer species differing in the average molar number p of addition by not less than 10 (preferably a difference in p by not less than 20), or a combination of not less than three monomer species differing in p by not less than 10 (preferably a difference in m by not less than 20) from one another. Furthermore, as for the range of p for combined use, it is possible to combine a monomer having an average molar number p of addition in the range of 40 to 300 with a monomer having the range of 1 to 40 (the difference in p being not less than 10, preferably not less than 20), or combine a monomer having an average molar number p of addition in the range of 20 to 300 with a monomer having the range of 1 to 20 (the difference in m being not less than 10, preferably not less than 20).

In the case that the monomer represented by the formula (5) is a polyalkylene glycol ester monomer, as for the oxyalkylene group represented by $-(R^aO)_p-$, it is preferred that the ethylene oxide site be added to the site of the ester bond with (meth)acrylic acid ($R^8R^9C=CR^{10}$—COOH) from the viewpoint of esterification productivity improvement with (meth)acrylic acid.

As for the above $R^{11}$, if the number of carbon atoms exceeds 30, the hydrophobicity of the cement admixture composite of the present invention becomes excessively strong, so that good dispersing ability may not be obtained. From the dispersing ability viewpoint, a preferred embodiment of $R^{11}$ is a hydrocarbon group containing 1 to 20 carbon atoms or a hydrogen, more preferably a hydrocarbon group containing not more than 10 carbon atoms, still more preferably not more than 5 carbon atoms, further still more preferably not more than 3 carbon atoms, and especially preferably not more than 2 carbon atoms. Among the hydrocarbon groups, saturated alkyl groups and unsaturated alkyl groups are preferred. These alkyl groups may be straight chained or branched. For attaining excellent segregation preventing capacity and rendering the air amount entrained into cement compositions adequate, hydrocarbon groups containing not less than 5 carbon atoms are preferred, and hydrocarbon groups containing not more than 20 carbon atoms are preferred. More preferred are hydrocarbon groups containing 5 to 10 carbon atoms. Among the hydrocarbon groups, saturated alkyl groups and unsaturated alkyl groups are preferred. These alkyl groups may be straight chained or branched.

Suitable as the above-mentioned unsaturated alcohol-polyalkylene glycol adduct are, for example, vinyl alcohol-alkylene oxide adducts, (meth)allyl alcohol-alkylene oxide adducts, 3-buten-1-ol-alkylene oxide adducts, isoprene alcohol (3-methyl-3-buten-1-ol)-alkylene oxide adducts, 3-methyl-2-buten-1-ol-alkylene oxide adducts, 2-methyl-3-buten-2-ol-alkylene oxide adducts, 2-methyl-2-buten-1-ol-alkylene oxide adducts, and 2-methyl-3-buten-1-ol-alkylene oxide adducts, and the like.

Suitable as the above-mentioned unsaturated alcohol-polyalkylene glycol adduct are also polyethylene glycol monovinyl ether, methoxypolyethylene glycol monovinyl ether, polyethylene glycol mono(meth)allyl ether, methoxypolyethylene glycol mono(meth)allyl ether, polyethylene glycol mono(2-methyl-2-propenyl) ether, polyethylene glycol mono(2-butenyl) ether, polyethylene glycol mono(3-methyl-3-butenyl) ether, polyethylene glycol mono(3-methyl-2-butenyl) ether, polyethylene glycol mono(2-methyl-3-butenyl) ether, polyethylene glycol mono(2-methyl-2-butenyl) ether, polyethylene glycol mono(1,1-dimethyl-2-propenyl)ether, polyethylene-polypropylene glycol mono(3-methyl-3-butenyl) ether, methoxypolyethylene glycol mono(3-methyl-3-butenyl) ether, ethoxypolyethylene glycol mono(3-methyl-3-butenyl) ether, 1-propoxypolyethylene glycol mono(3-methyl-3-butenyl) ether, cyclohexyloxypolyethylene glycol mono(3-methyl-3-butenyl) ether, 1-octyloxypolyethylene glycol mono(3-methyl-3-butenyl) ether, nonylalkoxypolyethylene glycol mono(3-methyl-3-butenyl) ether, laurylalkoxypolyethylene glycol mono (3-methyl-3-butenyl) ether, stearylalkoxypolyethylene glycol mono(3-methyl-3-butenyl) ether, phenoxypolyethylene glycol mono (3-methyl-3-butenyl) ether, naphthoxypolyethylene glycol mono(3-methyl-3-butenyl) ether, methoxypolyethylene glycol monoallyl ether, ethoxypolyethylene glycol monoallyl ether, phenoxypolyethylene glycol monoallyl ether, methoxypolyethylene glycol mono(2-methyl-2-propenyl) ether, ethoxypolyethylene glycol mono(2-methyl-2-propenyl) ether, phenoxypolyethylene glycol mono(2-methyl-2-propenyl) ether and the like.

Suitable as the above-mentioned (alkoxy)polyalkylene glycol mono(meth)acrylate are esterification products of (meth)acrylic acid with alkoxypolyalkylene glycols, especially preferably alkoxypolyalkylene glycols which are mainly formed of an ethylene oxide group(s), obtained by addition of 1 to 300 moles of an alkylene oxide group(s) containing 2 to 18 carbon atoms to any of aliphatic alcohols containing 1 to 30 carbon atoms such as methanol, ethanol, 1-propanol, 2-propanol, 1-butanol, 2-butanol, 1-pentanol, 2-pentanol, 3-pentanol, 1-hexanol, 2-hexanol, 3-hexanol, octanol, 2-ethyl-1-hexanol, nonyl alcohol, lauryl alcohol, cetyl alcohol and stearyl alcohol; alicyclic alcohols containing 3 to 30 carbon atoms such as cyclohexanol; and unsaturated alcohols containing 3 to 30 carbon atoms such as (meth)allyl alcohol, 3-buten-1-ol and 3-methyl-3-buten-1-ol.

Suitable as said esterification products are those (alkoxy)polyethylene glycol (poly)(alkylene glycol containing 2 to 4 carbon atoms) (meth)acrylates which are given below:

Methoxypolyethylene glycol mono(meth)acrylate, methoxy{polyethylene glycol-(poly)propylene glycol} mono(meth)acrylate, methoxy{polyethylene glycol-(poly)butylene glycol} mono(meth)acrylate, methoxy{polyethylene glycol-(poly)propylene glycol-(poly)butylene glycol} mono(meth)acrylate, ethoxypolyethylene glycol mono(meth)acrylate, ethoxy{polyethylene glycol-(poly)propylene glycol} mono(meth)acrylate, ethoxy{polyethylene glycol-(poly)butylene glycol} mono(meth)acrylate, ethoxy{polyethylene glycol-(poly)propylene glycol-(poly)butylene glycol} mono(meth)acrylate, propoxypolyethylene glycol mono(meth)acrylate, propoxy{polyethylene glycol-(poly)propylene glycol} mono(meth)acrylate, propoxy{polyethylene glycol-(poly)butylene glycol} mono(meth)acrylate, propoxy{polyethylene glycol-(poly)propylene glycol-(poly)butylene glycol} mono(meth)acrylate, butoxypolyethylene glycol mono(meth)acrylate, butoxy{polyethylene glycol-(poly)propylene glycol} mono(meth)acrylate, butoxy{polyethylene glycol-(poly)butylene glycol} mono(meth)acrylate, butoxy{polyethylene glycol-(poly)propylene glycol-(poly)butylene glycol} mono(meth)acrylate, pentoxypolyethylene glycol mono(meth)acrylate, pentoxy{polyethylene glycol-(poly)propylene glycol} mono(meth)acrylate, pentoxy{polyethylene glycol-(poly)butylene glycol} mono(meth)acrylate, pentoxy{polyethylene glycol-(poly)propylene glycol-(poly)butylene glycol} mono(meth)acrylate, hexoxypolyethylene glycol mono(meth)acrylate, hexoxy{polyethylene glycol-(poly)propylene glycol} mono(meth)acrylate, hexoxy{polyethylene glycol-(poly)butylene glycol} mono(meth)acrylate, hexoxy{polyethylene glycol-(poly)propylene glycol-(poly)butylene glycol} mono(meth)acrylate, heptoxypolyethylene glycol mono(meth)acrylate, heptoxy{polyethylene glycol-(poly)propylene glycol} mono(meth)acrylate, heptoxy{polyethylene glycol-(poly)butylene glycol} mono(meth)acrylate, heptoxy{polyethylene glycol-(poly)propylene glycol-(poly)butylene glycol} mono(meth)acrylate, octoxypolyethylene glycol mono(meth)acrylate, octoxy{polyethylene glycol-(poly)propylene glycol} mono(meth)acrylate, octoxy{polyethylene glycol-(poly)butylene glycol} mono(meth)acrylate, octoxy{polyethylene glycol-(poly)propylene glycol-(poly)butylene glycol} mono(meth)acrylate, nonanoxypolyethylene glycol mono(meth)acrylate, nonanoxy{polyethylene glycol-(poly)propylene glycol} mono(meth)acrylate, nonanoxy{polyethylene glycol-(poly)butylene glycol} mono(meth)acrylate, nonanoxy{polyethylene glycol-(poly)propylene glycol-(poly)butylene glycol} mono(meth)acrylate, decanoxypolyethylene glycol mono(meth)acrylate, decanoxy{polyethylene glycol-(poly)propylene glycol} mono(meth)acrylate, decanoxy{polyethylene glycol-(poly)butylene glycol} mono(meth)acrylate, decanoxy{polyethylene glycol-(poly)propylene glycol-(poly)butylene glycol} mono(meth)acrylate, undecanoxypolyethylene glycol mono(meth)acrylate, undecanoxy{polyethylene glycol-(poly)propylene glycol} mono(meth)acrylate, undecanoxy{polyethylene glycol-(poly)butylene glycol} mono(meth)acrylate, undecanoxy{polyethylene glycol-(poly)propylene glycol-(poly)butylene glycol} mono(meth)acrylate, dodecanoxypolyethylene glycol mono(meth)acrylate, dodecanoxy{polyethylene glycol-(poly)propylene glycol} mono(meth)acrylate, dodecanoxy{polyethylene glycol-(poly)butylene glycol} mono(meth)acrylate, dodecanoxy{polyethylene glycol-(poly)propylene glycol-(poly)butylene glycol} mono(meth)acrylate, tridecanoxypolyethylene glycol mono(meth)acrylate, tridecanoxy{polyethylene glycol-(poly)propylene glycol} mono(meth)acrylate, tridecanoxy{polyethylene glycol-(poly)butylene glycol} mono(meth)acrylate, tridecanoxy{polyethylene glycol-(poly)propylene glycol-(poly)butylene glycol} mono(meth)acrylate, tetradecanoxypolyethylene glycol mono(meth)acrylate, tetradecanoxy{polyethylene glycol-(poly)propylene glycol} mono(meth)acrylate, tetradecanoxy{polyethylene glycol-(poly)butylene glycol} mono(meth)acrylate, tetradecanoxy{polyethylene glycol-(poly)propylene glycol-(poly)butylene glycol} mono(meth)acrylate, pentadecanoxypolyethylene glycol mono(meth)acrylate, pentadecanoxy{polyethylene glycol-(poly)propylene glycol} mono(meth)acrylate, pentadecanoxy{polyethylene glycol-(poly)butylene glycol} mono(meth)acrylate, pentadecanoxy{polyethylene glycol-(poly)propylene glycol-(poly)butylene glycol} mono(meth)acrylate, hexadecanoxypolyethylene glycol mono(meth)acrylate, hexadecanoxy{polyethylene glycol-(poly)propylene glycol} mono(meth)acrylate, hexadecanoxy{polyethylene glycol-(poly)butylene glycol} mono(meth)acrylate, hexadecanoxy{polyethylene glycol-(poly)propylene glycol-(poly)butylene glycol} mono(meth)acrylate, heptadecanoxypolyethylene glycol mono(meth)acrylate, heptadecanoxy{polyethylene glycol-(poly)propylene glycol} mono(meth)acrylate, heptadecanoxy{polyethylene glycol-(poly)butylene glycol} mono(meth)acrylate, heptadecanoxy{polyethylene glycol-(poly)propylene glycol-(poly)butylene glycol} mono(meth)acrylate, octadecanoxypolyethylene glycol mono(meth)acrylate, octadecanoxy{polyethylene glycol-(poly)propylene glycol} mono(meth)acrylate, octadecanoxy{polyethylene glycol-(poly)butylene glycol} mono(meth)acrylate, octadecanoxy{polyethylene glycol-(poly)propylene glycol-(poly)butylene glycol} mono(meth)acrylate, nonadecanoxypolyethylene glycol mono(meth)acrylate, nonadecanoxy{polyethylene glycol-(poly)propylene glycol} mono(meth)acrylate, nonadecanoxy{polyethylene glycol-(poly)butylene glycol} mono(meth)acrylate, nonadecanoxy{polyethylene glycol-(poly)propylene glycol-(poly)butylene glycol} mono(meth)acrylate, cyclopentoxypolyethylene glycol mono(meth)acrylate, cyclopentoxy{polyethylene glycol-(poly)propylene glycol} mono(meth)acrylate, cyclopentoxy{polyethylene glycol-(poly)butylene glycol} mono(meth)acrylate, cyclopentoxy{polyethylene glycol-(poly)propylene glycol-(poly)butylene glycol} mono(meth)acrylate, cyclohexoxypolyethylene glycol mono(meth)acrylate, cyclohexoxy{polyethylene glycol-(poly)propylene glycol} mono(meth)acrylate, cyclohexoxy{polyethylene glycol-(poly)butylene glycol} mono(meth)acrylate, cyclohexoxy{polyethylene glycol-(poly)propylene glycol-(poly)butylene glycol} mono(meth)acrylate.

As the above-mentioned (alkoxy)polyalkylene glycol mono(meth)acrylate, not only compounds described above, but also phenoxypolyethylene glycol mono(meth)acrylate, phenoxy{polyethylene glycol-(poly)propylene glycol} mono(meth)acrylate, phenoxy{polyethylene glycol-(poly)butylene glycol} mono(meth)acrylate, phenoxy{polyethylene glycol-(poly)propylene glycol-(poly)butylene glycol} mono(meth)acrylate, (meth)allyloxypolyethylene glycol mono(meth)acrylate, (meth)allyloxy{polyethylene glycol-(poly)propylene glycol} mono(meth)acrylate, (meth)allyloxy{polyethylene glycol- (poly)butylene glycol} mono(meth)acrylate and (meth) allyloxy{polyethylene glycol-(poly)propylene glycol-(poly) butylene glycol} mono(meth)acrylate are suitable.

Suitable as the above polyalkylene glycol unsaturated monomer, not only those described above, but also (alkoxy) polyalkylene glycol monomaleate, (alkoxy)polyalkylene glycol dimaleate and the like. As such monomers, the following ones are suitable.

Half esters and diesters derived from alkyl(poly)alkylene glycols obtained by addition of 1 to 500 moles of an oxyalkylene containing 2 to 18 carbon atoms to an alcohol containing 1 to 30 carbon atoms or an amine containing 1 to 30 carbon atoms and the above-mentioned unsaturated dicarboxylic acid monomers; half esters and diesters derived from the above-mentioned unsaturated dicarboxylic acid monomers and polyalkylene glycols having an average number of moles of a glycol(s) containing 2 to 18 carbon atoms as added of 2 to 500; half amides of maleamic acid with polyalkylene glycols having an average number of moles of a glycol(s) containing 2 to 18 carbon atoms as added of 2 to 500; (poly)alkylene glycol di(meth)acrylates such as triethylene glycol di(meth)acrylate, (poly)ethylene glycol di(meth)acrylate, polypropylene glycol di(meth)acrylate, and (poly)ethylene glycol-(poly)propylene glycol di(meth)acrylate; (poly)alkylene glycol dimaleates such as triethylene glycol dimaleate and polyethylene glycol dimaleate; and the like.

As for the other copolymerizable monomer(s), which may be the monomer component of the polymer composed of monomer components containing a polyalkylene glycol unsaturated monomer, the following compounds can be used.

(Meth)acrylic acid esters such as methyl (meth)acrylate, ethyl (meth)acrylate, propyl (meth)acrylate, butyl (meth) acrylate, pentyl (meth)acrylate, hexyl (meth)acrylate, decyl (meth)acrylate and lauryl (meth)acrylate; bifunctional (meth)acrylate such as hexanediol di(meth)acrylate; (meth) acrylic acid compounds such as hydroxyethyl (meth)acrylate, hydroxypropyl (meth)acrylate, methoxyethyl (meth) acrylate, ethoxyethyl (meth)acrylate, butoxyethylethyl (meth)acrylate, and methoxypropyl (meth)acrylate.

Half esters and diesters derived from unsaturated dicarboxylic acid as mentioned above and alcohols containing 1 to 30 carbon atoms; half amides and diamides derived from the above-mentioned unsaturated dicarboxylic acid monomer and an amine containing 1 to 30 carbon atoms; half esters derived from the above-mentioned unsaturated dicarboxylic acid monomer and glycol containing 2 to 18 carbon atoms; half amide derived from maleamine acid and glycol containing 2 to 18 carbon atoms; multifunctional (meth) acrylate such as hexanediol di (meth)acrylate, trimethylolpropane tri (meth)acrylate and trimethylolpropane di (meth) acrylate; unsaturated sulfonic acids and monovalent metal salt divalent metal salt, ammonium salt and organic ammonium salt thereof, for example, vinylsulfonate, (meth)allylsulfonate, 2-(meth) acryloxyethylsulfonate, 3-(meth)acryloxypropylsulfonate, 3-(meth)acryloxy-2-hydroxypropyl sulfophenyl ether, 3-(meth)acryloxy-2-hydroxypropyloxysulfobenzoate, 4-(meth) acryloxybutylsufonate, (meth) acrylamidomethylsulfonate, (meth)acrylamidoethylsulfonate, 2-methylpropanesulfonic acid (meth)acrylamide, and styrenesulfonic acid; amides derived from unsaturated monocarboxylic acid and amines containing 1 to 30 carbon atoms, for example, methyl (meth)acrylamide; vinyl aromatic compounds such as styrene, α-methylstyrene, bromostyrene, chlorostyrene, vinyltoluene and p-methylstyrene; α-olefins such as hexane, heptene and decene; alkyl vinyl ethers such as methyl vinyl ether, ethyl vinyl ether and butyl vinyl ether; allyl esters such as allyl acetate; allyls such as allyl alcohol;

alkanediol mono (meth)acrylates such as 1,4-butanediolmono (meth)acrylates, 1,5-pentanediol mono (meth)acrylate and 1,6-hexanediol mono (meth)acrylate; dienes such as butadiene, isoprene, isobutyrene, 2-methyl-1,3butadiene and 2-chloro-1,3-butadiene, unsaturated amides such as (meth)acrylamide, (meth)acrylalkylamide, N-methylol (meth)acrylamide and N,N-dimethyl (meth)acrylamide; unsaturated cyano compounds such as (meth)acrylonitrile and α-chloroacrylonitrile; unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate and vinylpyridine; divinyl aromatic compounds such as divinylbenzene; cyanurates such as triallyl cyanurate; and siloxane derivatives such as polydimethylsiloxanepropylaminomaleamidic acid, polydimethylsiloxaneaminopropyleneaminomaleamicid acid, polydimethylsiloxane-bis (propylaminomaleamidic acid), polydimethylsiloxane-bis (dipropyleneaminomaleamidic acid), polydimethylsiloxane-(1-propyl-3-acrylate), polydimethylsiloxane-(1-propyl-3-methacrylate), polydimethylsiloxane-bis (1-propyl-3-acrylate) and polydimethylsiloxane-bis (1-propyl-3-methacrylate).

As the above-mentioned other copolymerizable monomer, the following multi-branched polyoxyalkylene group-containing ethylene monomers (1) to (3) may be used: (1) a macromer obtained by adding glycidyl methacrylate to a multi-branched polymer obtained by adding alkylene oxide to polyalkylene imine; (2) a (meth)acrylic ester macromer of a multi-branched polymer obtained by adding alkylene oxide to polyalkylene imine; and (3) a maleic acid ester macromer of a multi-branched polymer obtained by adding alkylene oxide to polyalkylene imine. As the multi-branched polymer mentioned above, those obtained by adding alkylene oxide to polyamidopolyimine and a polyhydric alcohol may also be used.

As the above polyalkyleneimine, there may be mentioned, for example, a homopolymer and a copolymer obtained by polymerization, in the conventional manner, of one or two or more of alkyleneimines containing 2 to 8 carbon atoms, such as ethyleneimine, propyleneimine, 1,2-butyleneimine, 2,3-butyleneimine and 1,1-dimethylethyleneimine. Such a polyalkyleneimine may have any of the straight chain structure, branched chain structure and three-dimensionally crosslinked structure. Furthermore, ethylenediamine, diethylenetriamine, triethylenetetramine, tetraethylenepentamine or the like may also be used. Such polyalkyleneimines generally have, in their structure, not only a tertiary amino group but also primary amino and secondary amino (imino) groups having an active hydrogen atom, respectively.

The weight average molecular weight of the polyalkyleneimine is preferably 100 to 100000. More preferably, it is 300 to 50000, and still more preferably 600 to 10000.

Suited for use as the above alkylene oxide are alkylene oxide containing 2 to 8 carbon atoms such as ethylene oxide, propylene oxide, butylene oxide, isobutylene oxide, 1-butene oxide, 2-butene oxide, trimethylethylene oxide, tetramethylene oxide, tetramethylethylene oxide, butadiene monoxide and octylene oxide and, further, aliphatic epoxides such as dipentaneethylene oxide and dihexaneethylene oxide; alicyclic epoxides such as trimethylene oxide, tetramethylene oxide, tetrahydrofuran, tetrahydropyran and octylene oxide; and aromatic epoxides such as styrene oxide, 1,1-diphenylethylene oxide and the like. Among them, ethylene oxide, propylene oxide and butylene oxide are preferred. Further preferably, it is mainly formed of ethylene oxides.

The average molar number of addition of the oxyalkylene group in the above-mentioned alkylene oxide adduct is preferably not less than 0.5 and not more than 300. More preferably, it is not less than 1, still more preferably not less than 1.5, especially preferably not less than 2, and most preferably 3. On the other hand, it is more preferably not more than 200, still more preferably not more than 150, especially preferably not more than 100, and most preferably not more than 50. When the average molar number of addition of the oxyalkylene group in the above-mentioned alkylene oxide adduct is out of the range, hydrophobicity of the polymer to be produced may not become sufficient.

As a preferable embodiment of the polymer comprising the polyalkylene glycol unsaturated monomer of the present invention, there may be mentioned: (i) a polycarboxylic acid polymer having the site represented by the above formula (1) as mentioned above; (ii) a polymer obtained by copolymerizing monomer components containing a mono(polyoxyalkylene) unsaturated monomer (A), an unsaturated carboxylic acid monomer (B), a poly(polyoxyalkylene) unsaturated monomer (C) and an unsaturated carboxylic acid derivative monomer (D); and (iii) a polymer obtained by polymerizing monomer components comprising 20 to 90 mole % of an alkyl (meth)acrylate monomer, 5 to 60 mole % of a polyalkylene glycol unsaturated monomer and 5 to 70 mole % of an unsaturated carboxylic acid monomer. Two or more of these embodiments. may be used in combination.

Hereinafter, the embodiment (ii) mentioned above will be described.

In the embodiment (ii) mentioned above, the content ratios of the respective monomers of the monomer components. are preferably 20 to 99% by mass of the mono(polyoxyalkylene) unsaturated monomer (A), 0.1 to 50% by mass of the unsaturated carboxylic acid monomer (B), 0.1 to 60% by mass of the poly(polyoxyalkylene) unsaturated monomer (C), and 0.1 to 30% by mass of the unsaturated carboxylic acid derivative monomer (D). The content ratios of the above-mentioned monomers are the values in the case where the entire amount of monomer components to be copolymerized is determined to be 100% by mass.

The content ratio of the above-mentioned mono(polyoxyalkylene) unsaturated monomer (A) is preferably not less than 20% by mass, more preferably not less than 25% by mass, still more preferably not less than 35% by mass, and especially preferably not less than 45% by mass. Moreover, it is preferably not more than 99% by mass, more preferably not more than 90% by mass, still more preferably not more than 80% by mass, and especially preferably not more than 70% by mass.

The content ratio of the above-mentioned unsaturated carboxylic acid monomer (B) is preferably not less than 0.1% by mass, more preferably not less than 1% by mass, still more preferably not less than 3% by mass, especially preferably not less than 5% by mass, and most preferably not less than 10% by mass. Moreover, it is preferably not more than 50% by mass, more preferably not more than 40% by mass, still more preferably not more than 35% by mass, and especially preferably not more than 30% by mass.

The content ratio of the above-mentioned poly(polyoxyalkylene) unsaturated monomer (C) is preferably not less than 0.1% by mass, more preferably not less than 3% by mass, still more preferably not less than 5% by mass, and especially preferably not less than 10% by mass. Moreover, it is preferably not more than 60% by mass, more preferably not more than 50% by mass, still more preferably not more than 40% by mass, and especially preferably not more than 30% by mass.

The content ratio of the above-mentioned unsaturated carboxylic-acid derivative monomer (D) is preferably not less than 0.1% by mass, more preferably not less than 2% by mass, and still more preferably not less than 3% by mass, and especially preferably not less than 5% by mass. Moreover, it is preferably not more than 30% by mass, more preferably not more than 25% by mass, still more preferably not more than 20% by mass, and especially preferably not more than 15% by mass.

Besides the above-mentioned monomers (A) to (D), a monomer (E) copolymerizable with the monomers (A) to (D) may be used in combination. In the case where the monomer (E) is used, the ratio is preferably as follows: the total of monomers (A) to (D)/the monomer (E)=100 to 60/40 to 0 (% by mass).

More preferably, the total of monomers (A) to (D)/the monomer (E)=100 to 65/35 to 0 (% by mass), still more preferably the total of monomers (A) to (D)/the monomer (E)=100 to 75/25 to 0 (% by mass), and especially preferably the total of monomers (A) to (D)/the monomer (E)=100 to 85/15 to 0 (% by mass).

The mono(polyoxyalkylene) unsaturated monomer (A) is preferably similar to the above-mentioned polyalkylene glycol unsaturated monomer. The unsaturated carboxylic acid monomer (B) is preferably similar to the above-mentioned unsaturated carboxylic acid monomer. The unsaturated carboxylic acid derivative monomer (D) is preferably a compound derived from an unsaturated carboxylic acid of the above-mentioned other copolymerizable monomers. As the above-mentioned monomer (E), the above-mentioned other copolymerizable monomers except for the monomer (D) are preferable.

As the poly(polyoxyalkylene) unsaturated monomer (C), any monomer can be used without any particular limitation as long as it contains an unsaturated group and two or more polyoxyalkylene groups in one molecule. Preferable examples thereof may include a polyalkyleneimine monomer containing a polymerizable unsaturated group and a polyoxyalkylene group, and a monomer having a structure resulting from binding of an oxyalkylene group to residue of a polyhydric alcohol. In addition, the above-mentioned poly-branched polyoxyalkylene group-containing ethylene monomers (1) to (3) described as other copolymerizable monomers can be employed.

The above-mentioned polyalkyleneimine monomer containing an unsaturated group and a polyoxyalkylene group can be obtained by reaction of a compound, which is obtained by adding alkylene oxide to a nitrogen atom of an amino group or an imino group of polyalkylene imine, with an unsaturated compound containing a functional group reactive to a hydroxyl, amino or imino group. The nitrogen atom of the amino group or imino groups to which alkylene oxide is added have an active hydrogen atom.

In the case where the polyalkyleneimine monomer containing an unsaturated group and a polyoxyalkylene group is obtained, suitable for introducing an unsaturated group(s) into the above-mentioned compound resulting from addition of an alkylene oxide to a polyalkyleneimine, for example, the unsaturated group introducing method comprising subjecting the hydroxyl group(s) of the compound resulting from addition of an alkylene oxide to a polyalkyleneimine to transesterification with an unsaturated compound such as .(meth)acrylic acid or (meth)acrylic acid alkyl ester; the unsaturated group introducing method comprising amidating the amino group of the compound resulting from addition of an alkylene oxide to a polyalkyleneimine with an unsaturated compound such as (meth)acrylic acid or a (meth)acrylic acid alkyl ester; and the unsaturated group introducing method comprising reacting the hydroxyl group(s) of the compound resulting from addition of an alkylene oxide to a polyalkyleneimine with an epoxy compound such as glycidyl (meth)acrylate or (meth)allyl glycidyl ether.

The above-mentioned polyalkyleneimine is preferably the same as mentioned above, and alkylene oxide to be added to the polyalkyleneimine is preferably the same as mentioned above.

As the above unsaturated compound, there may be mentioned, for example, unsaturated carboxylic acids such as (meth)acrylic acid, maleic acid, fumaric acid and citraconic acid; unsaturated carboxylic acid anhydrides such as (meth)acrylic anhydride and maleic anhydride; unsaturated carboxylic acid halides such as (meth)acrylic chloride; unsaturated carboxylic acid esters such as alkyl (meth)acrylates which have an alkyl group containing 1 to 30 carbon atoms, a maleic acid monoester which have an alkyl group containing 1 to 30 carbon atoms and a maleic acid diester which have an alkyl group containing 1 to 30 carbon atoms; and epoxy compounds such as glycidyl (meth)acrylate and (meth)allyl glycidyl ether.

Shown below, as an example of the reaction formula for obtaining the polyalkyleneimine monomer having an unsaturated group and polyoxyalkylene group mentioned above is the reaction formula according to which polyethyleneimine is synthesized from ethyleneimine using an initiator, a polyethyleneimine-ethylene oxide adduct is then produced by addition of ethylene oxide to nitrogen atoms bearing active hydrogen atom(s) of the polyethyleneimine and the transesterification reaction with methacrylic acid is carried out. There is also available the method which comprises synthesizing polyethyleneimine, then causing ethylene oxide to add to nitrogen atoms bearing active hydrogen atom(s) of the polyethyleneimine and then reacting the resulting polyethyleneimine-ethylene oxide adduct with glycidyl methacrylate.

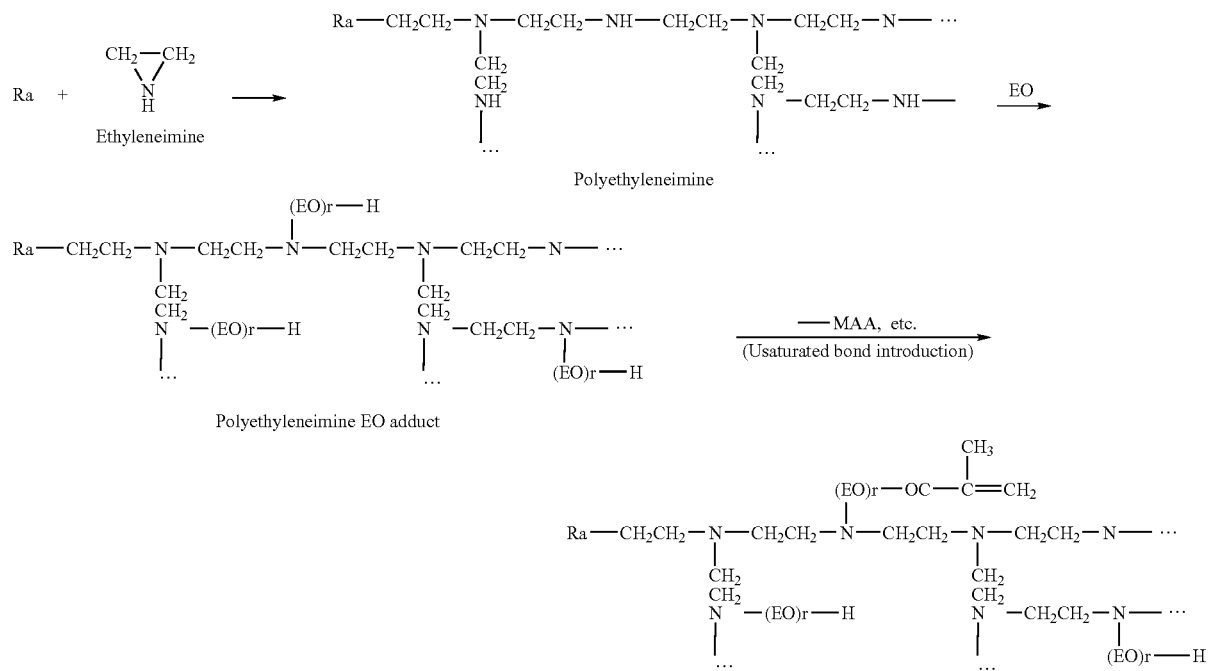

In the above reaction formula, Ra represents an initiator, EO represents ethylene oxide, -(EO)r-H indicates that the group is a result of addition of r ethylene oxide molecules to nitrogen atoms bearing active hydrogen atom(s) of the polyethyleneimine, and MAA represents methacrylic acid. The symbol "..." in the chemical formula means that the polymer chain continues in the same manner.

The above-mentioned polyalkyleneimine monomer having an unsaturated group and polyoxyalkylene group has a polyalkyleneimine chain. Preferably, such polyalkyleneimine chain is mainly formed of ethyleneimine.

As regards the above-mentioned polyalkyleneimine monomer containing an unsaturated group and polyoxyalkylene group, the average number of polymerization of the alkyleneimine in each polyalkyleneimine chain is preferably, for example, 2 to 300. When it is less than 2, the functions of the polyalkyleneimine monomer may not be fully performed and, when it exceeds 300, the polymerizability of the polyalkyleneimine monomer may possibly decrease. More preferably, it is 2 to 100, still more preferably 3 to 100, further still more preferably 5 to 100, especially preferably 5 to 75, and most preferably 5 to 50. In this case, the average number of polymerization of diethylenetriamine is regarded as 2 and the average number of polymerization of triethylenetetramine is regarded as 3.

The above-mentioned polyalkyleneimine monomer containing an unsaturated group and a polyoxyalkylene group has a group or groups formed by one oxyalkylene group or a group or groups resulting from addition of two or more oxyalkylene groups. The group or groups resulting from addition of two or more oxyalkylene groups are composed of one or two or more oxyalkylene group species and, when they are composed of two or more oxyalkylene group species, the two or more oxyalkylene group species may be in any addition mode, for example in a random, block or alternating addition mode. In cases where a plurality of groups formed by the oxyalkylene group(s) mentioned above occur in one and the same molecule, they may be the same or different. Preferably, such groups formed by the oxyalkylene group(s) mentioned above are mainly formed of oxyethylene group(s).

The average molar number of addition of the oxyetylene group(s) in the above-mentioned polyalkyleneimine monomer having an unsaturated group and polyoxyalkylene group is preferably, for example, 0 to 300. When it exceeds 300, the polymerizability of the polyalkyleneimine unsaturated monomer may possibly decrease. More preferably, it is 0.3 to 270, still more preferably 0.5 to 250, especially preferably 1 to 220, and most preferably 2 to 200. When the average molar number of addition of the oxyalkylene group in the polyalkyleneimine unsaturated monomer is out of such range, functional effects of the polycarboxylic acid copolymer for improving fluidity of a cement composition and the like cannot be sufficiently performed. Furthermore, the polyalkyleneimine monomer with the above average molar number of addition of 0 does not contain an oxyalkylene group.

The weight average molecular weight of the polyalkyleneimine monomer having an unsaturated group and polyoxyalkylene group is preferably, for example, 1000 to 500000. More preferably, it is 3000 to 300000, still more preferably 8000 to 200000, further still more preferably 10000 to 100000, and especially preferably 15000 to 80000.

The above-mentioned monomer having a structure resulting from binding of an oxyalkylene group to residue of a polyhydric alcohol can be produced, for example, by reacting a compound resulting from addition of an alkylene oxide to the hydroxyl group(s) of a polyhydric alcohol with an unsaturated compound containing a functional group reactive with the hydroxyl group of said compound.

The polyhydric alcohol residue mentioned above means a group having a structure such that an active hydrogen atom(s) is(are) removed from a hydroxyl group(s) of a polyhydric alcohol but is not particularly limited to groups formed upon reaction with the polyhydric alcohol. As for the alkylene oxide(s) to be added to the hydroxyl group(s) of the polyhydric alcohol, the same ones as those mentioned hereinabove may be mentioned.

As the method of producing the monomer having a structure resulting from binding of an oxyalkylene group to residue of a polyhydric alcohol, there may be mentioned, for example, (1) the method comprising introducing a compound obtained by addition of an alkylene oxide(s) into a polyhydric alcohol, and (2) the method comprising subjecting not less than 1 mole of glycidol to addition reaction to each mole of an unsaturated alcohol-polyalkylene glycol adduct of an unsaturated alcohol to generate two or more hydroxyl groups in each molecule, followed by addition of an alkylene oxide(s).

In the above method (1), the unsaturated group introduction is preferably effected, for example, by the method comprising esterifying or transesterifying the hydroxyl group(s) of the compound resulting from addition of an alkylene oxide(s) to residue of a polyhydric alcohol with an unsaturated compound such as (meth)acrylic acid or a (meth)acrylic acid alkyl ester such as methyl (meth)acrylate for unsaturated group introduction; the method comprising reacting the hydroxyl group(s) of the compound resulting from addition of an alkylene oxide(s) to a polyhydric alcohol with an epoxy compound containing 2 to 5 carbon atoms, such as glycidyl (meth)acrylate or (meth)allyl glycidyl ether, for unsaturated group introduction; or the method comprising etherifying with an alkenyl halide containing 2 to 5 carbon atoms, such as (meth)allyl chloride for unsaturated group introduction. As the unsaturated group(s) of alkenyl compounds, an unsaturated group containing not less than 4 carbon atoms is preferable, more preferably an unsaturated group containing not less than 5 carbon atoms. And methallyl group and isoprenyl(3-methyl-3-butenyl) group are preferable to allyl group. Furthermore, (meth)acryloyl group is also preferable.

The above-mentioned polyhydric alcohol is not particularly restricted but may be any of those compounds which have, on an average, three or more hydroxyl groups in each molecule. A Preferred form is the compound whose polyhydric alcohol residue is constituted of three elements, namely carbon, hydrogen and oxygen.

The above polyhydric alcohol preferably contains three or more hydroxyl groups but not more than 300 hydroxyl groups. When the number of such hydroxyl groups is less than 3, the monomer having a structure resulting from binding of an oxyalkylene group to residue of a polyhydric alcohol may fail to perform its functions to a satisfactory extent. When it exceeds 300, the polymerizability of the monomer having a structure resulting from binding of an oxyalkylene group to residue of a polyhydric alcohol may possibly decrease. The number of such hydroxyl groups is more preferably not less than 4, still more preferably not less than 5, and most preferably not less than 6. On the other hand, it is more preferably not more than 100, still more preferably not more than 50, and most preferably not more than 25.

Suited for use as the polyhydric alcohol are polyglycidol, glycerin, polyglycerin, trimethylolethane, trimethylolpropane, 1,3,5-pentatriol, erythritol, pentaerythritol, dipentaerythritol, sorbitol, sorbitan, sorbitol-glycerin condensates, adonitol, arabitol, xylitol, mannitol and the like.

Also suited for use are saccharides, for example hexose saccharides such as glucose, fructose, mannose, indose, sorbose, gulose, talose, tagatose, galactose, allose, psicose and altrose; pentose saccharides such as arabinose, ribulose, ribose, xylose, xylulose and lyxose; tetrose saccharides such as threose, erythrulose and erythrose; other saccharides such as rhamnose, cellobiose, maltose, isomaltose, trehalose, sucrose, raffinose, gentianose and melezitose; sugar alcohols and sugar acids derived from these (saccharide: glucose; sugar alcohol: glucitol; sugar acid: gluconic acid); and the like. Furthermore, partially etherified or partially esterified derivatives of the compounds specifically mentioned above are also suitable.

In the following, the embodiment (iii) mentioned above will be described.

In the embodiment of the above-mentioned (iii), the monomer is obtained by polymerizing monomer components containing 20 to 90 mole % of an alkyl (meth)acrylate monomer, 5 to 60 mole % of a polyalkylene glycol unsaturated monomer and 5 to 70 mole % of an unsaturated carboxylic acid monomer.

In the monomer components, the ratio of an alkyl (meth) acrylate monomer is 20 to 90 mole %. If the ratio of the alkyl (meth)acrylate monomer is less than 20 mole %, the viscosity of the cement composition may not be decreased sufficiently. The preferable range is 20 to 70 mole %. More preferably, it is 20 to 60 mole %, and still more preferably 22 to 55 mole %. The ratio of a polyalkylene glycol unsaturated monomer is 5 to 60 mole %, but it is preferably 10 to 50 mole %. More preferably, it is 15 to 40 mole %. The ratio of an unsaturated carboxylic acid monomer is 5 to 70 mole %, but it is preferably 19 to 65 mole %. More preferably, it is 30 to 60 mole %. Furthermore, in the case where the fourth component is contained besides the above-mentioned alkyl (meth)acrylate monomer, polyalkylene glycol unsaturated monomer, and unsaturated carboxylic acid monomer, the ratio thereof is preferably in a range of 0 to 30 mole %. These "mole % (percent)" values are those calculated on the basis of 100 mole % of the total of the alkyl (meth)acrylate monomer, polyalkylene glycol unsaturated monomer, unsaturated carboxylic acid monomer and the fourth component.

The weight average molecular weight of the polymer in the above-mentioned embodiment (iii) is preferably not more than 20000. When it exceeds 20000, slump-retaining ability of cement compositions may not be sufficiently improved, and cement compositions may not be provided easy to handle. It is preferably 4000 to 18000, more preferably 5000 to 14000, and still more preferably 6000 to 12000.

The unsaturated carboxylic monomer is the same as the unsaturated carboxylic monomer mentioned above, and the alkyl (meth)acrylate is preferably the alkyl (meth)acrylate in the other copolymerizable monomer mentioned above.

As the polyalkylene glycol unsaturated monomer, those mentioned above are preferably used, and those having polyalkylene glycol chain length of not more than 25 mole are preferable. Consequently, the function in improving the dispersing ability of a cement composition owing to the hydrophilicity of the oxyalkylene group and the steric repulsion polyalkylene glycol can be performed sufficiently.

In such a case, the average molar number p of addition of oxyalkylene groups represented by the above $R^aO$ in the above-mentioned formula (5) is a number of 25 or less. A preferred range of p is not less than 2 and, the average molar number of addition of the oxyetylene group(s) in —$(R^aO)_p$— is preferably not less than 2. When p is less than the above molar number, sufficient levels of steric hindrance to disperse cement particles or the like may not be obtained. When the average molar number of addition of the oxyetylene group(s) is less than the above molar number, sufficient levels of hydrophilicity to disperse cement particles or the like may not be obtained. The upper limit of p and the average molar number of addition of the oxyetylene group(s) is preferably not more than 24, more preferably not more than 20, and still more preferably not more than 15. The range of p, and the range of the average molar number of addition of the oxyetylene group(s) in —$(R^aO)_p$— is preferably 2 to 25. More preferably, they are 2 to 24, and still more preferably 6 to 20.

It is possible to use, as the polyalkylene glycol unsaturated monomer, a combination of two or more monomer species differing in the average molar number p of addition of the oxyalkylene group(s). As a suitable combination, for example, a combination of two monomer species differing the average molar number p of addition by not more than 5 (preferably a difference in p by not more than 3), a combination of two monomer species differing in the average molar number p of addition by not less than 5 (preferably a difference in p by not less than 10), or a combination of not less than three monomer species differing in p by not less than 5 from one another. Furthermore, as for the range of p for combined use, it is possible to combine a monomer having an average molar number p of addition in the range of 20 to 25 with a monomer having the range of 1 to 20 (the difference in p being not less than 10, and preferably not less than 20).

The polymer composed of monomer components containing a polyalkylene glycol unsaturated monomer in the present invention may be obtained by the same methods as the polymerization methods of the polycarboxylic acid polymer to be used for the cement admixture of the present invention, and preferably methods may include steps of (i) changing the mole ratio of the monomer components at least once in a reaction vessel during reaction and/or (ii) carrying out polymerization by using a mixture containing a water-soluble polymer and water as a solvent.

The method (i) preferably involves a step of changing the mole ratio A/C at least once during polymerization of a polyoxyalkylene unsaturated monomer (A), an unsaturated carboxylic acid monomer (B), and other unsaturated monomer (C), wherein the molar numbers of the respective monomers (A), (B) and (C) charged from the initial stage to that point are represented as A, B and C, respectively. In addition, the above method preferably involves a step of changing at least one of the mole ratios A/C1 and A/C2 at least once during polymerization, wherein C1 and C2 respectively represent the molar numbers of a (meth)acrylic acid ester monomer and a multi-branched polyoxyalkylene group-containing ethylene monomer, which are preferable as the monomer (C), charged from the initial stage to that time. In this case, the mole ratio C1/C2 may be changed or may not be changed during the polymerization if both (meth)acrylic acid ester monomer and multi-branched polyoxyalkylene group-containing ethylene monomer are used as the monomer (C). Furthermore, mole ratio B/C may be changed or may not be changed during the polymerization.

In the method (i), the mole ratio of the monomer (A) and the monomer (B) is preferably kept constant during the polymerization. In this case, the mole ratio A/B is constant during the polymerization, and at least one of the mole ratios A/C1 and A/C2 is preferably changed at least once during polymerization.

Changing of the mole ratio mentioned above may be carried out by increasing the mole ratio, decreasing the mole ratio, or combining increase and decrease of the ratios and changing the alteration extents. The mole ratio may be changed stepwisely or continuously. As a method for changing the mole ratio during the polymerization in such a manner, a method of adding dropwise one or all of the monomer (A), the monomer (B) and the monomer (C) to a polymerization vessel and changing the titration rate of the monomer stepwisely or continuously may be carried out. Preferably, the titration rate of other unsaturated monomer (C) is changed. Accordingly, the mole ratio A/C is changed at least once during the polymerization to give a copolymer.

Incidentally, since the mole ratio A/C may be changed at least once during the polymerization, for example, the mole ratio may be changed by carrying out polymerization of the monomer (A) and the monomer (B) and polymerization of the monomer (A), the monomer (B), and the monomer (C). In this case, there exist the polymerization period for producing a copolymer of the monomer (A) and the monomer (B) and the polymerization period for producing a copolymer of the monomer (A), the monomer (B), and the monomer (C). In the case where the monomer (C) is added dropwise, after the polymerization of the monomer (A) and the monomer (B) is carried out, the polymerization of the monomer (A), the monomer (B) and the monomer (C) is carried out by adding the monomer (C) dropwise to change the mole ratio A/C at least once during the polymerization.

As the above-mentioned acrylic acid ester monomer (C1), the (meth)acrylic acid esters exemplified as the above-mentioned other copolymeriable monomers are preferable. As the above-mentioned multi-branched polyoxyalkylene group-containing ethylene monomer (C2), multi-branched polyoxyalkylene group-containing ethylene monomers exemplified as the above-mentioned other copolymerizable monomers are preferable. With respect to the use ratio of the monomers, the use ratio of the (meth)acrylic acid ester monomer (C1) is preferably not less than 0.1 mole % and not more than 100 mole % in the case where the use ratio of the unsaturated carboxylic acid monomer (B) is determined to be 100 mole %. More preferably, it is not less than 1 mole %, and not more than 60 mole %. Still more preferably, it is not less than 3 mole %, and not more than 30 mole %.

Furthermore, the ratio of multi-branched polyoxyalkylene group-containing ethylene monomer (C2) is preferably not less than 0.01 mole % and not more than 10 mole %. More preferably, it is not less than 0.05 mole %, and not more than 5 mole %. Still more preferably, it is not less than 0.1 mole %, and not less than 3 mole %.

In the above-mentioned methods for changing the mole ratio, at least two different copolymers with different mole ratio A/B/C of the respective monomer units are contained. From the viewpoint that the cement admixture using the copolymers have various characteristics of the respective copolymers, and the sufficient effects of the present invention is exhibited, it is preferable to form a mixture of three or more different types of copolymers with different mole ratio A/B/C by changing mole ratio of the respective monomer components during polymerization.

Furthermore, it is preferable to form a copolymer mixture containing at least three types of copolymers among the copolymers obtained by polymerization of monomer components containing three or more types of monomers, the monomer (A), the monomer (B) and the monomer (C), and copolymers obtained by polymerization of monomer components containing two types of monomers, the monomer (A) and the monomer (B). That is, it is preferable to form a copolymer mixture containing three or more types of copolymers with different mole ratio of A/B/C, or a copolymer mixture containing two or more types of copolymers with different mole ratio of A/B/C and one or more types of copolymers obtained by using two types of monomers, the monomer (A) and the monomer (B).

In the above-mentioned method (ii), the water-soluble polymer is preferably a water-soluble polymer having a branched structure and/or a polycarboxylic acid polymer.

That is, polymerization of the monomer components is preferably carried out by using any of the following (1) to (3) as a solvent: (1) a mixture of the water-soluble polymer having a branched structure and water; (2) a mixture of the polycarboxylic acid polymer and water; and (3) a mixture of the water-soluble polymer having a branched structure, the polycarboxylic acid polymer and water.

As described, in the method (ii), in the case where the solvent to be used for the polymerization indispensably contains water, a mixture containing a water-soluble polymer and water is used as the solvent for the polymerization and as the water-soluble polymer to be used for the solvent, those which have no polymerizable unsaturated double bond and thus are not taken in the polymer are preferable. For example, water-soluble polymers other than so-called macromonomers are preferably used.

The polycarboxylic acid polymer may be used in the form of a cement admixture, or the polycarboxylic acid monomer may be the water-soluble polymer having the branched structure.

The concentration of the water-soluble polymer to be used as a solvent in the above-mentioned polymerization in the polymerization is preferably not less than 1% by mass and not more than 80% by mass in the total 100% by mass of the water-soluble polymer and water in order to sufficient exhibit the effect of the water-soluble polymer as a solubility-improving agent. More preferably, it is not less than 3% by mass and not more than 60% by mass, and still more preferably not less than 5% by mass and not more than 40% by mass.

The amount of the water-soluble polymer to be used as a solvent to the polymer to be synthesized is preferably 1 to 500% by mass in the case where the amount of the polymer to be synthesized is assumed to be 100% by mass. More preferably, it is 1 to 300% by mass, still more preferably 1 to 80% by mass, especially preferably 5 to 60% by mass, and most preferably 10 to 40% by mass.

Furthermore, the amount of the water-soluble polymer to be used as a solvent to the monomer components to be used for the polymerization is preferably not less than 2% by mass in the case where the total amount of all of the monomer components to be used for the polymerization is assumed to be 100% by mass, and more preferably the amount exceeding 10% by mass.

With respect to the above-mentioned water-soluble polymer to be used as the solvent, the water-soluble polymer having a branched structure may be one or two or more species of polymers having a structure in which the chains forming polymers are branched and at least one species of polymers selected from the group consisting of alkylene oxide added to polyalkyleneimine (a polyalkyleneimine-alkylene oxide adduct), alkylene oxide added to a polyhydric alcohol (a polyhydric alcohol-alkylene oxide adduct), other alkylene oxide having a branched structure (alkylene oxide having a branched structure other than the polyalkyleneimine-alkylene oxide adduct and a polyhydric alcohol-alkylene oxide adduct), and polyamidopolyamine having a branched structure is preferably used.

Furthermore, as the polycarboxylic acid polymer to be used as a solvent, it is preferably water-soluble and preferably contains 10 or more average molar number of addition of the polyoxyalkylene groups. Accordingly, the polymer can sufficiently exhibit the effect as a solubility-improving agent. More preferably, it is not less than 25 and not more than 200, still more preferably it is not less than 25 and not more than 100.

With respect to the water-solubility of the water-soluble polymer to be used as the solvent, it is preferable to specify the water-solubility by HLB (Hydrophile-Lipophile Balance). The polycarboxylic acid polymer to be used as a solvent is preferable to have 19 or more HLB, and other water-soluble polymer is preferable to have 15 or more HLB.

The above-mentioned method (ii) can be applied suitably for the case where the water-solubility of the monomer components to be used for polymerization is low and/or the case where the hydrophobicity of the polymer to be produced is high, and gel formation during the polymerization can efficiently be suppressed. In such case, the polymer to be used as a solvent effectively functions as a solubility-improving agent. Also in this case, the extents of the water solubility and the hydrophobicity are preferably specified on the basis of HLB and the average value of HLB of the monomer components and/or HLB of the polymer to be produced is preferably less than 19.5.

If HLB of the monomer components and the polymer to be produced is less than 19.5, the method (ii) can effectively suppress the gel formation in such polymerization system, whereas a conventional production method highly possibly produces gel. HLB is more preferably not more than 19, more preferably not more than 18.5. In a conventional production method, if HLB of the monomer components and the polymer to be produced is 18.5 to 19, a large quantity of gel is produced. If it is not more than 18.5, there is high possibility that the polymerization becomes difficult. For example, the monomer components are gathered in the polymerization system, so that it becomes impossible to carry out polymerization uniformly: the polymer to be produced have too high molecular weight to be water-insoluble; and polymerization of only monomer components with high hydrophilicity is promoted and copolymerization is not promoted sufficiently.

The method (ii) can also be applied preferably if the pH of the polymerization system, that is pH of the polymerization solution is not less than 1.5 and not more than 7. The pH is more preferably not more than 5. If pH exceeds such a range, the water-solubility of the polymer to be produced is increased; therefore, even in the case where the pH is high and the HLB of the monomer components and the polymer to be produced is low, gel formation probably becomes difficult and the method (ii) cannot sufficiently exhibit the advantageous effect in some cases. However, if the pH is too high, the polymerization ratio of the acid monomers among the monomer components is probably decreased. Accordingly, in order to effectively exhibit the effect of the method (ii), the pH is preferably controlled to be in the above-mentioned range.

The above-mentioned HLB is preferably calculated according to Griffin's HLB and calculated from the following equation:

$$HLB=(\text{molecular weight of a hydrophilic group})/(\text{molecular weight of the whole body})\times100/5=(\%\text{ by mass of the hydrophilic group})/5$$

In the above-mentioned Griffin's HLB, for example, an alkyl group is a hydrophobic group and $CH_2CH_2O$ is a hydrophilic group and calculation is to be carried out using 44 as the molecular weight. Incidentally, in the case of a propylene oxide chain ($CH(CH_3)CH_2O$), a methyl group is regarded as a hydrophobic group and the rests are regarded as the hydrophilic groups (it is not determined according to Griffin's HLB).

With respect to the polycarboxylic acid polymer to be used as the solvents in the method (ii), HLB is applied to the side chain (except for carboxylic acid). However, an ester part (COO) is not included.

For example, the calculation may be carried out as follows.

In the case of methyl methacrylate (MMA), the side chain is a methyl group and HLB value is 0. In the case of methoxy polyethylene glycol monomethacrylate (the average molar number of addition of ethylene oxide: 10), the side chain is methoxy polyethylene glycol (methoxy PEG) and HLB is as follows.

$$HLB=(44\times10)/(15+44\times10)\times100/5=19.34$$

In the case where the composition of the monomer components is MMA/methoxy polyethylene glycol monomethacrylate (60/40 mole ratio), HLB is as follows.

$$HLB=(44\times10\times40)/\{15\times60+(15+44\times10)\times40\}\times100/5=18.4$$

Incidentally, the side chain means the part represented by "(side chain)" when a monomer is represented by "X-(side chain)" (X represents, for example, C=C—COO, C=C—C—C, C=C—C and the like).

In the above-mentioned method (ii), as the manner of water-soluble polymer existence and the polymerization method, polymerization may be carried out by filling a reaction pot with a polymer to be used as a solvent or monomer components or polymerization may be carried out by adding them dropwise to the reaction pot. For example, the following methods (1) to (3) are preferable: (1) a reaction pot is filled with water and the water-soluble polymer, and monomer components are added thereto dropwise to carry out polymerization; (2) a reaction pot is filled with water, and monomer components and the water-soluble polymer are added thereto dropwise to carry out polymerization; and (3) a reaction pot is filled with water, the water-soluble polymer, and monomer components to carry out polymerization.

In the reaction pot in which the water-soluble polymer is obtained by polymerization, the monomer components may newly be added, preferably the monomer components may newly be added dropwise, to carry out polymerization. In such case, it is preferable to use a water-soluble polymer as the solvent other than a polycarboxylic acid polymer and it is more preferable to use a water-soluble polymer having a branched structure as a solvent. Furthermore, it is preferable to carry out polymerization in such a manner of sufficiently suppressing the gel formation owing to the function of the polymer as a solvent.

In the above-mentioned method (ii), gel formation can be suppressed. The amount of the gel is preferably in a range of not more than 5% by mass, more preferably not more than 0.1% by mass, in the case where the total amount of the monomer components to be polymerization is assumed to be 100% by mass. Accordingly, the quality of the cement admixture composite of the present invention can be improved. The mass of the gel can be calculated by measuring the total mass of the gel remaining on a sieve when the polymerization reaction solution is filtered by a standardized sieve (mesh size 1 mm) according to JIS Z 8801 and the gel in water-containing state adhering to the reaction vessel, stirring blades, thermometer and the like.

As for the above-mentioned water-soluble polymer having a branched structure, it is preferable to use at least one polymer selected from the group consisting of a polyalkyleneimine-alkylene oxide adduct, a polyhydric alcohol-alkylene oxide adduct, alkylene oxide having a branched structure other than these, and polyamidopolyamine having a branched structure as described above.

The polyalkyleneimine-alkylene oxide adduct may be any polyalkyleneimine containing an oxyalkylene group, and it is preferably the compound resulting from addition of an alkylene oxide to the nitrogen atom(s) of the amino and/or imino group(s) of a polyalkyleneimine, which is described in the above-mentioned poly(polyoxyalkylene) unsaturated monomer (C).

The polyhydric alcohol-alkylene oxide adduct may be any compound having a structure resulting from binding of an oxyalkylene group to residue of a polyhydric alcohol, and it is preferably the compound resulting from addition of an alkylene oxide to the hydroxyl group(s) of a polyhydric alcohol, which is described in the above-mentioned poly(polyoxyalkylene) unsaturated monomer (C).

As the above-mentioned alkylene oxide having a branched structure other than these, there may be mentioned a dendrimer compound obtained by reacting alkylene oxide. The dendrimer compound is a compound having a branched structure comprising a plurality of straight chain sites extended radially from the center part of the molecule. For example, there may be mentioned a compound having a dendrimer structure composed of a center branch part comprising at least one branching point and straight chain parts extended radially therefrom and comprising at least three straight chain parts in every single molecule or a compound having their cross-linking structure. The number of the straight chain parts in the dendrimer compound is preferably 3 to 500, and more preferably. 10 to 200.

As a method for producing the above-mentioned dendrimer compound, there may be mentioned, a method comprising using a compound containing at least one active hydrogen in one molecule as a starting substance and carrying out reaction by adding a chain-extension agent. If necessary, a branching agent may be added, and in such case, the starting substance, branching agent and chain-extension agent may be added successively or simultaneously to carry out reaction.

As the above-mentioned starting substance, for example, in the case where the reaction is carried out by adding only the chain-extension agent without using the branching agent, a compound containing three or more reactive functional groups reactive with the chain-extension agent in one molecule is preferred. Furthermore, in the case where branching is promoted by using the branching agent, the starting substance is preferably a compound containing one or more functional groups reactive with the branching agent or the chain-extension agent in one molecule. As such starting substance, there may be mentioned, for example, a polysaccharide such as sorbitol; a polycarboxylic acid such as citric acid; a polyamine such as ethylenediamine and diethylenetriamine; and the like.

The above-mentioned chain-extension agent may be any compound capable of growing molecular chains while leaving one or more active hydrogen atoms in the terminal by the continuous addition reaction to the active hydrogen atoms. Alkylene oxide is preferably used and the above-mentioned compounds can be used. The above-mentioned branching agent may be any compound capable of modifying into a molecular form newly having two or more active hydrogen atoms by reaction with one active hydrogen atom and the agent may be a reactive compound to be used for branching by reaction with the terminal of mainly a straight molecular chain and becoming a part of the molecular chain. As such a branching agent, for example, glycidol and the like capable of adding two hydroxyl groups by one molecule addition via a ring-opening reaction of an epoxy group is preferably used.

In the compounds resulting from addition of an alkylene oxide, the average molar number of addition of the alkylene oxide is preferably not less than 10 and not more than 300. When it exceeds 300, the polymerizability of the monomer providing these compounds may be decrease. More preferably, it is not less than 15, and still more preferably not less than 20. On the other hand, it is more preferably not more than 270, still more preferably not more than 250, especially preferably not more than 220, and most preferably not more than 200.

The polyamidopolyamine having a branched structure may be any compound having two or more amino groups and two or more amide bonds in each molecule, and it is preferably a polyamidopolyamine compound resulting from addition of 0 to 8 moles of an alkylene oxide(s) containing 2 to 4 carbon atoms to each mole of the total of the amino and imino groups of the polyamidopolyamine obtained by reacting 1.0 mole of a polyalkylenepolyamine (hereinafter referred to also as "compound (d1)") with 0.8 to 0.95 mole of a dibasic acid and/or an ester of a dibasic acid with an alcohol containing 1 to 4 carbon atoms (hereinafter referred to also as "compound (d2)"). In this case, the product obtained by condensation polymerization of the compound (d1) and compound (d2) becomes a polyamidopolyamine having a constant range of chain length formed by condensation polymerization in a compound (d1)/compound (d2) mole ratio of 5/4 to 20/19 on an average. And, the addition of 0 to 8 moles of an alkylene oxide(s) containing 2 to 4 carbon atoms to 1 mole of the sum of the amino and imino groups of this polyamidopolyamine is to provide the polyamidopolyamine compound.

Suitable as the alkylene oxide(s) containing 2 to 4 carbon atoms are one or two or more species of ethylene oxide, propylene oxide and butylene oxide.

The above compound (d1) may be any compound having a plurality of alkylene groups and a plurality of amino and/or imino groups in each molecule. Suitable for use are one or two or more species of diethylenetriamine, triethylenetetramine, tetraethylenepentamine, pentaethylenehexamine, dipropylenetriamine, tripropylenetetramine and tetrapropylenepentamine. Among them, diethylenetriamine and triethylenetetramine are preferably used in view of their ready availability and production cost.

Suited for use as the above compound (d2) (a dibasic acid and/or an ester of a dibasic acid with an alcohol containing 1 to 4. carbon atoms) are one or two or more species of malonic acid, succinic acid, fumaric acid, maleic acid, glutaric acid, adipic acid, pimelic acid, phthalic acid, azelaic acid and sebacic acid, and esters of these with an alcohol containing 1 to 4 carbon atoms. Among them, adipic acid is preferably used in view of the ready availability and production cost.

Suited as the alcohol containing 1 to 4 carbon atoms and serving to form the above compound (d2) are one or two or more species of methanol, ethanol, propanol and butanol, inclusive of isomers thereof.

The polyamidopolyamine is obtained by reacting the compound (d1) with the compound (d2), with or without using an additional compound(s) other than these compounds. For obtaining the above-mentioned polyamidopolyamine, it is essential to subject the compound (d1) and the compound (d2) to condensation polymerization and, in that case, for example, condensation polymerization techniques can be used. In this reaction method, the respective compounds may be subjected to reaction all at once or may be subjected to reaction stepwise or successively.

As the polycarboxylic acid polymer to be used as a solvent, a polymer obtained by polymerization of monomer components containing a polyalkylene glycol unsaturated monomer, an unsaturated carboxylic acid monomer and, if necessary, other unsaturated monomers are preferably used.

As the mole ratio of monomer components in the above-mentioned polycarboxylic acid polymer used as a solvent, the mole ratio of (the polyalkylene glycol unsaturated monomer/the unsaturated carboxylic monomer/the other unsaturated monomer) is preferably 3 to 60/20 to 95/0 to 50. It is more preferably 5 to 50/30 to 90/0 to 20.

The weight average molecular weight of the water-soluble polymer having a branched structure and/or the polycarboxylic acid polymer is preferably 5000 to 100000, more preferably 10000 to 40000, and still more preferably 15000 to 20000.

As for the polymer having a nitrogen atom, which may be contained in the cement admixture composite of the present invention, suitable are an alkylene oxide adduct of polyethyleneimine, polyethyleneimine, polyamidopolyamine, polyvinyl pyrrolidone, a vinyl pyrrolidone copolymer, polyacrylamide, a polyacrylamide copolymer, a copolymer of a monomer having a nitrogen atom and a copolymerizable monomer, and the like. In addition, as the polymer having a nitrogen atom, it is also possible to use the polymer having a nitrogen atom described in the above-mentioned water-soluble polymer in the above-mentioned method (ii).

Suitable as the alkylene oxide in the above-mentioned alkylene oxide adduct of polyethyleneimine are as the same one as mentioned above, and the average molar number of addition of the oxyalkylene group is preferably not less than 1 and not more than 100. More preferably, it is not more than 50, still more preferably not more than 20, and most preferably not more than 10. The weight average molecular weight of the above-mentioned polymer having a nitrogen atom is preferably not less than 1000 and not more than 1000000. More preferably, it is not less than 5000 and not more than 100000, still more preferably not less than 10000 and not more than 50000.

As the polymer having a branched structure and an oxyalkylene group, which may be contained in the cement admixture composite of the present invention, the alkylene oxide added to a polyhydric alcohol (the polyhydric alcohol-alkylene oxide adduct) and the alkylene oxide having a branched structure (the alkylene oxide having a branched structure other than the polyalkyleneimine-alkylene oxide adduct and polyhydric alcohol-alkylene oxide adducts) are preferably used. Furthermore, it is also possible to use those other than polymers having nitrogen atoms among the water-soluble polymers in the above-mentioned method (ii).

The cement admixture and the cement admixture composite of the present invention can be added to cement compositions such as cement paste, mortar, concrete or the like and used, in the same manner as known cement admixtures. And, they can suitably be used also in ultrahigh strength concrete.

Suitable as the above cement composition are ones in general use which contain cement, water, fine aggregate, coarse aggregate and the like. These may be added with fine powders, such as fly ash, blast-furnace slag, silica fume, and limestone. The term "ultrahigh strength concrete" means the one generally so called in the field of cement compositions, namely that kind of concrete which, in strength of the hardening products thereof, is comparable to or higher than that of conventional concrete species even when the water/cement ratio is reduced as compared with conventional levels. For example, even when the water/cement ratio is not higher than 25% by mass, further not higher than 20% by mass, in particular not higher than 18% by mass, particularly not higher than 14% by mass, especially about 12% by mass, that kind of concrete shows that level of workability at which any trouble will not arise in ordinary use, and the hardening product shows a compressive strength of not lower than 60 N/mm$^2$, further not lower than 80 N/mm$^2$, further more not lower than 100 N/mm$^2$, in particular not lower than 120 N/mm$^2$, particularly not lower than 160 N/mm$^2$, especially not lower than 200 N/mm$^2$.

Suitable as the above cement are ordinary, high early strength, ultra high early strength, moderate heat, white or like portland cement; and blended portland cement species such as high alumina cement, calucium-alumina cement, portland fly-ash cement, portland blast-furnace slag cement, silica cement and the like. As the formulation amount and the unit water content of said cement per 1 m$^3$ of concrete is, for example, for producing high durability and high strength concrete, the unit water content is preferably 100 to 185 kg/m$^3$ and the water/cement ratio is preferably 10 to 70%. More preferably, the unit water content is 120 to 175 kg/M$^3$, and water/cement ratio is 20 to 65%.

As regards the addition amount ratio of the cement admixture and the cement admixture composite of the present invention to the cement composition, it is preferred that the polycarboxylic acid polymer, which is contained in the present invention, amount to not less than 0.01% by mass but more than 10% by mass relative to the whole cement mass being taken as 100% by mass. If it is less than 0.01% by mass, insufficient performance characteristics may result. If it exceeds 10% by mass, the economy will be poor. More preferably, it is not less than 0.05% by mass but more than 8% by mass, still more preferably not less than 0.1% by mass but more than 5% by mass. Said mass percentage values are reduced values of the solid matter.

The following combinations (1) to (6) of constituents other than cement and water in the above-mentioned cement composition may be mentioned as particularly preferred embodiments:

(1) Combination of <1> the cement admixture of the present invention and <2> an oxyalkylene antifoaming agent as two essential constituents. The mixing mass ratio of the oxyalkylene antifoaming agent <2> is preferably 0.01 to 20% by mass relative to the cement admixture <1>.

(2) Combination of <1> the cement admixture of the present invention, <2> the oxyalkylene antifoaming agent, and <3> an AE (air-entraining) agent as three essential constituents. Usable as the oxyalkylene antifoaming agents are polyoxyalkylenes, polyoxyalkylene alkyl ethers, polyoxyalkylene acetylene ethers, polyoxyalkylene alkyl amines. Among them, polyoxyalkylene alkyl amines are especially preferable. As the mixing mass ratio of the cement admixture <1> and the antifoaming agent <2>, the mixing mass ratio of the antifoaming agent <2> is preferably 0.01 to 20% by mass relative to the cement admixture <1>. Meanwhile, the mixing mass ratio of the AE agent <3> is preferably 0.001 to 2% by mass relative to cement.

(3) Combination of <1> the cement admixture of the present invention and <2> a material segregation reducing agent as two essential constituents. Usable as the material segregation reducing agents are various thickening agents such as nonionic cellulose ethers, and compounds containing, as partial structures, a hydrophobic substituent comprising a hydrocarbon chain containing 4 to 30 carbon atoms and a polyoxyalkylene chain resulting from addition of 2 to 300 moles, on average, of an alkylene oxide(s) containing 2 to 18 carbon atoms, among others. The mixing mass ratio between the cement admixture <1> and the material segregation reducing agent <2> is preferably 10/90 to 99.99/0.01, and more preferably 50/50 to 99.9/0.1. Cement compositions containing this combination are suited for use as high flowing concrete, self-filling concrete and self-leveling compositions.

(4) Combination of <1> the cement admixture of the present invention and <2> a retarder as two essential constituents. Usable as the retarders are oxycarboxylic acids such as gluconic acid (salts) and citric acid (salts), saccharides such as glucose, sugar alcohols such as sorbitol, and phosphonic acids such as aminotri(methylenephosphonic acid), among others. Particularly preferred are oxycarboxylic acids. The mixing mass ratio between the cement admixture <1> and the retarder <2> is preferably 10/90 to 99.9/0.1, and more preferably 20/80 to 99/1.

(5) Combination of <1> the cement admixture of the present invention and <2> an accelerator as two essential constituents. Usable as the accelerators are soluble calcium salts such as calcium chloride, calcium nitrite and calcium nitrate, chlorides such as iron chloride and magnesium chloride, thiosulfate salts, formic acid, and formate salts such as calcium formate, among others. The mixing mass ratio between the cement admixture <1> and the accelerator <2> is preferably 0.1/99.9 to 90/10, and more preferably 1/99 to 70/30.

(6) Combination of <1> the cement admixture of the present invention and <2> a sulfonic acid (type) dispersant containing a sulfonic acid group in the molecule as two essential constituents. Usable as the sulfonic acid dispersants are ligninsulfonates, naphthalenesulfonic acid-formaline condensates, melaminesulfonic acid-formaline condensates, polystyrenesulfonic acid salts, aminoarylsulfonic acid-phenol-formaldehyde condensates, and the like. The mixing mass ratio between the cement admixture <1> and the sulfonic acid dispersant <2> is preferably 5/95 to 95/5, and more preferably 10/90 to 90/10.

In the present invention, when the cement admixture composite is used in the cement composition, it is preferable to change formulation forms (mixing forms) of the polymer according to the properties required and mixing conditions of the cement composition. For example, in view of the compressive strength, it is preferable to mix two species of polymers introduced with a PPG (polypropyrene glycol) skeleton rather than to mix one species of said polymer. Thereby, it becomes possible to improve the compressive strength by 3 to 15% compared with the case of mixing one species of the polymer. Moreover, the condition and slump-retaining ability also become superior. The PO (propyrene oxide) mole ratio in one species of the polymer is preferably 3 to 20 mole %, especially preferably 8 to 15 mole %. On the other hand, in view of the water-reducing ability, it is preferable to mix one species of polymer introduced with a PPG skeleton. When two species of the polymers are mixed, the addition amount of the cement admixture composite possibly tends to increase. The PO mole ratio in one species of the polymer preferably 3 to 20 mole %, especially preferably 8 to 15 mole %.

The cement admixture and the cement admixture composite of the present invention, which has the constitution described hereinabove, can suitably be applied to various cement compositions and the like and, in addition, can provide such a level of viscosity as facilitating the works on the sites of handling them, so that the use of the cement admixture of the present invention leads to improvement in water-reducing ability of cement compositions and to increased strength and durability of hardened products obtained therefrom and, further, to a viscosity that facilitates the works on the sites of handling of cement compositions, whereby the work efficiency in constructing civil engineering and building structures is improved.

BEST MODES FOR CARRYING OUT THE INVENTION

The following examples illustrate the present invention more specifically. They are, however, by no means limitative of the scope of the invention. In the examples, "part(s)" means "part(s) by mass" and "%" represents "% by mass", unless otherwise specified.

In the following Examples, the weight average molecular weight of the polymer was measured by the following conditions.

<GPC Molecular Weight Measurement Conditions>
Column used: Tosoh TSK guard column SWXL+TSK gel G4000SWXL+G3000SWXL+G2000SWXL
Eluent: Sodium acetate trihydrate (115.6 g) is dissolved in a mixed solvent composed of 10999 g of water and 6001 g of acetonitrile, and the solution is further adjusted to pH 6.0 with acetic acid and used as the solution of the eluent.
Injection volume: 100 µL of the solution of the eluent with 0.5% polymer concentration
Eluent flow rate: 0.8 mL/min
Column temperature: 40° C.
Standard samples: Polyethylene glycol, peak-top molecular weights (Mp) 272500, 219300, 85000, 46000, 24000, 12600, 4250, 7100, 1470
Order of Calibration curve: 3rd-order
Detector: Waters, Japan's 410 differential refractive index detector
Analysis software: Waters, Japan's MILLENNIUM Ver. 3.21

PRODUCTION EXAMPLE 1

(Production of $H-(OC_2H_4)_{13}-(OC_3H_6)_2-(OC_2H_4)_{10}-OCH_3$)

A reaction apparatus equipped with a thermometer, stirrer, raw material inlet tube and nitrogen inlet tube was charged with 1100 g of polyethylene glycol (n=10) monomethyl ether and 0.5 of potassium hydroxide. The reaction vessel inside was purged with nitrogen, and heated to 120° C. While maintaining this temperature 235 g of propylene oxide was added over 3 hours. After the addition, the reaction solution was matured at 120° C. for 2 hours, and the reaction vessel was again purged with nitrogen at 120° C. Then 1165 g of ethylene oxide was added over 3 hours. After the addition, the reaction solution was further aged at 120° C. for 1 hour to obtain alkylene glycol monomethyl ether with a hydroxyl value of 48 mg·KOH/g.

PRODUCTION EXAMPLE 2

(Production of the Monomer (a))

A reaction vessel equipped with a thermometer, a stirrer, raw material inlet tube and condensate water separation tube was charged with 2203 g of the alkylene glycol monomethyl ether obtained in Production Example 1, 450 g of methacrylic acid, 59 g of para-toluenesulfonic acid monohydrate, 0.5 g of phenothiazine and, as an azeotropic solvent, 265 g of cyclohexane. While maintaining the temperature at 115° C. for 20 hours, esterification was carried out by separating condensate water. At the esterification efficiency of 99% (the conversion ratio of alkylene glycol monomethyl ether), 556 g of distilled water and 46 g of 30% sodium hydroxide solution were added. Then, the reaction vessel was heated again to remove cyclohexane by azeotropic boiling, and distilled water was added to obtain an aqueous solution of a mixture of 70% of the ester compound (a-1) having a structure of the monomer (a) and 10% of unreacted methacrylic acid.

EXAMPLE A

A reaction vessel equipped with a thermometer, stirrer, dropping device, nitrogen inlet tube and reflux condenser was charged with 50 g of distilled water, and the contents were heated to 80° C. Next, a solution composed of 203 g of a mixture of esterification product (a-1) and methacrylic acid obtained in Production Example 2, 17.6 g of methacrylic acid, 76.6 g of distilled water and 2.8 g of 3-mercaptopropionic acid were added dropwise over 4 hours, and a solution composed of 47.9 g of distilled water and 2.1 g of ammonium persulfate was added dropwise over 5 hours to the reaction vessel. The reaction mixture was then matured with maintaining the temperature in the vessel at 80° C. for 1 hour and cooled, and the mixture was neutralized with a 30% aqueous solution of sodium hydroxide to pH 7. Furthermore, distilled water was added thereto to give a cement admixture (1) (solid matter concentration of 20%) containing a polymer having 75% of the site derived from the esterification product (a-1) with a weight average molecular weight of 14000.

EXAMPLE B

A reaction vessel equipped with a thermometer, stirrer, dropping device, nitrogen inlet tube and reflux condenser was charged with 50 g of distilled water, and the contents were heated to 80° C. Next, a solution composed of 214 g of a mixture of esterification product (a-1) and methacrylic acid obtained in Production Example 2, 8.6 g of methacrylic acid, 74.8 g of distilled water and 2.4 g of 3-mercaptopropionic acid were added dropwise over 4 hours, and a solution composed of 47.9 g of distilled water and 2.1 g of ammonium persulfate was added dropwise over 5 hours to the reaction vessel. The reaction mixture was then matured with maintaining the temperature in the vessel at 80° C. for 1 hour and cooled, and the mixture was neutralized with a 30% aqueous solution of sodium hydroxide to pH 7. Furthermore, distilled water was added thereto to give a cement admixture (2) (solid matter concentration of 20%) containing a polymer having 80% of the site derived from the esterification product (a-1) with a weight average molecular weight of 15000.

EXAMPLE C

A reaction vessel equipped with a thermometer, stirrer, dropping device, nitrogen inlet tube and reflux condenser was charged with 50 g of distilled water, and the contents were heated to 80° C. Next, a solution composed of 214 g of a mixture of esterification product (a-1) and methacrylic acid obtained in Production Example 2, 8.6 g of methacrylic acid, 74.8 g of distilled water and 1.3 g of 3-mercaptopropionic acid were added dropwise over 4 hours, and a solution composed of 47.9 g of distilled water and 2.1 g of ammonium persulfate was added dropwise over 5 hours to the reaction vessel. The reaction mixture was then matured with maintaining the temperature in the vessel at 80° C. for 1 hour and cooled, and the mixture was neutralized with a 30% aqueous solution of sodium hydroxide to pH 7. Furthermore, distilled water was added thereto to give a cement admixture (3) (solid matter concentration of 20%) containing a polymer having 80% of the site derived from the esterification product (a-1) with a weight average molecular weight of 20000.

COMPARATIVE EXAMPLE A

A reaction vessel equipped with a thermometer, stirrer, dropping device, nitrogen inlet tube and reflux condenser was charged with 333.7 g of distilled water, and the contents were heated to 80° C. Next, a solution composed of 375.3 g of methoxypolyethylene glycol monomethacrylate (average molar number of addition of ethylene oxide is 25), 74.7 g of methacrylic acid, 112.5 g of distilled water and 3.8 g of 3-mercaptopropionic acid were added dropwise over 4 hours, and a solution composed of 94.8 g of distilled water and 5.2 g of ammonium persulfate was added dropwise over 5 hours to the reaction vessel. The reaction mixture was then matured with maintaining the temperature in the vessel at 80° C. for 1 hour, and then cooled. Thereafter, the mixture was neutralized with a 30% aqueous solution of sodium hydroxide to pH 7, further distilled water was added to give a cement admixture (comparative 1) (solid matter concentration of 20%) containing a polymer having a weight average molecular weight of 22000.

Using the cement admixtures obtained in Examples A to C and Comparative Example A, concrete was prepared using each admixture, and the fluidity and conditions of mixing by a scoop were evaluated. Results are shown in Table 1.

<Concrete Test>

(Concrete Formulation)

Regarding the unit amount of formulation, 172 kg/m$^3$ of water, 491 kg/m$^3$ of cement (product of Taiheiyo Cement, Ordinary portland cement), 909.8 kg/m$^3$ of coarse aggregate (Oume crushed stone), 744.5 kg/m$^3$ of fine aggregate (Ohigawa river sand) were used.

An antifoaming agent MA404 (product of Pozzolith Bussan Co., Ltd.) and an AE agent MA303A (product of Pozzolith Bussan Co., Ltd.) in amounts of 0.003% and 0.01%, respectively, of the cement mass were mixed.

The mixing amount of the cement admixture relative to the cement mass was calculated as the solid matter amount of the admixture, and shown in Table 1 by % (% by mass).

In the above-mentioned amount, cement, fine aggregates and coarse aggregates were charged into a 50L forced action mixer and conducted to dry mixing for 10 seconds. Then, water formulated with each cement admixture was added, and mixing was further performed for 60 seconds to produce concrete. The concrete obtained was measured for slump flow value and air amount (air content) according to the Japanese Industrial Standards (JIS A 1101, 1128, and 6204). In the slump test, the time required from a point that a slump cone is pulled up to a point that fluidization of concrete was stopped was measured, and determined as the flow stop value to be shown in Table 1.

The concrete condition shows the feeling when the concrete was mixed using a scoop and was evaluated based on the 5-point scores from 1 to 5 points. That is, 5 points were marked in the case of the excellent state that the light touch and wet but no viscous feeling were felt and 1 point was marked in the case of inferior state that the heavy and sticky touch and viscous and stiff feeling were felt, and the higher point means concrete better and easy to handle.

TABLE 1

| Cement admixture | Amount of addition (% by mass) | Slump flow value (mm) | Flow stop value (sec) | Air amount (% by volume) | Concrete condition (point) |
|---|---|---|---|---|---|
| (1) | 0.15 | 540 | 11.4 | 4.0 | 4 |
| (2) | 0.14 | 480 | 10.3 | 4.6 | 5 |
| (3) | 0.14 | 500 | 10.8 | 4.5 | 5 |
| (Comparative 1) | 0.13 | 520 | 13.3 | 3.7 | 1 |

As shown in Table 1, the cement admixture of the present invention had short flow stop values showing low viscosity and the feeling of mixing by a scoop was good and thus they were found easy to handle and excellent in construction workability.

PRODUCTION EXAMPLE 3

A glass-made reaction apparatus equipped with a thermometer, stirrer, dropping device and reflux condenser was charged with 754 g of a polyethyleneimine-ethylene oxide adduct (compound obtained by addition of 20 moles, on average, of ethylene oxide to an active hydrogen atom of polyethyleneimine with Molecular Weight 600), 1.27 g of acetic acid, and 0.15 g of p-methoxyphenol, and the contents were heated to 90° C. with stirring. Maintaining the temperature in the reaction system at 90° C., 12.5 g of glycidyl methacrylate was added over 30 minutes. After completion of the addition, stirring was continued at 90° C. for 1 hour, and thereafter the contents were cooled to 60° C., further 768 g of water and 14.3 g of acetic acid were added to give a macromer aqueous solution of polyethyleneimine-ethylene oxide adduct.

PRODUCTION EXAMPLE 4

A reaction vessel equipped with a thermometer, stirrer, dropping device, nitrogen inlet tube and reflux condenser was charged with 700 g of distilled water, and the contents were heated to 70° C. Next, a solution composed of 832.5 g of methoxypolyethylene glycol monomethacrylate (average molar number of addition of ethylene oxide is 10), 260.5 g of methacrylic acid, 154.1 g of methyl methacrylate, 36.2 g of a 48% aqueous solution of sodium hydroxide, 40.2 g of 3-mercaptopropionic acid and 243 g of distilled water were added dropwise over 5 hours. Then, 240 g of a 2.1% aqueous hydrogen peroxide solution was added dropwise over 6 hours, 240 g of a 2.7% aqueous L-ascorbic acid solution was added dropwise over 6 hours. After 4 hours and 5 minutes from starting to drop these solutions, 208 g of the macromer solution obtained in Production Example 3 was added dropwise at 3.78 g per minute. After completion of the dropping of all solutions, the temperature was maintained at 70° C. for 1 hour. Thereafter, the reaction mixture was cooled and then neutralized with a 30% aqueous solution of sodium hydroxide to pH 7, whereby a cement admixture with a weight average molecular weight of 6000 as determined by gel permeation chromatography and expressed on the polyethylene glycol equivalent basis.

PRODUCTION EXAMPLE 5

A reaction vessel equipped with a thermometer, stirrer, dropping device, nitrogen inlet tube and reflux condenser was charged with 995 g of distilled water, and the contents were heated to 70° C. Next, a solution composed of 1067 g of methoxypolyethylene glycol monomethacrylate (average molar number of addition of ethylene oxide is 6), 283 g of methacrylic acid, 41.2 g of a 48% aqueous solution of sodium hydroxide, 20 g of 3-mercaptopropionic acid and 354 g of distilled water were added dropwise over 5 hours, and 240 g of a 6.5% aqueous solution of ammonium persulfate was added dropwise over 6 hours to the reaction vessel. After completion of the dropping, the temperature was maintained at 70° C. for 1 hour. Thereafter, the reaction mixture was cooled and then neutralized with a 30% aqueous solution of sodium hydroxide to pH 7, whereby a cement admixture with a weight average molecular weight of 14000 as determined by gel permeation chromatography and expressed on the polyethylene glycol equivalent basis is obtained.

PRODUCTION EXAMPLE 6

A reaction apparatus equipped with a thermometer, stirrer, dropping device and reflux condenser was charged with 1200 g of a polyethyleneimine-ethylene oxide adduct (compound obtained by addition of 3 moles, on average, of ethylene oxide to an active hydrogen atom of polyethyleneimine with Molecular Weight 600), 0.25 g of methoquinone, 37.5 g of acetic acid, and the contents were heated to 90° C. with reflux cooling with stirring. After maintaining the temperature at 90° C. for 30 minutes, 94.7 g of glycidyl methacrylate was added dropwise over 1 hour to the reaction vessel. Thereafter, the contents were matured at 90° C. for 1 hour and then cooled to 65° C., and 1980 g of distilled water and 157.2 g of methacrylic acid were added. The contents was further cooled to the room temperature to give a macromer of polyethyleneimine-ethylene oxide adduct.

PRODUCTION EXAMPLE 7

A glass-made reaction apparatus equipped with a thermometer, stirrer, dropping device and reflux condenser was charged with 344 g of distilled water, and the reaction apparatus inside was purged with nitrogen with stirring, and the contents were heated to 70° C. Next, a monomer aqueous solution composed of 1076 g of methoxypolyethylene glycol monomethacrylate (average molar number of addition of ethylene oxide is 4), 190 g of methacrylic acid, 754.6 g of the macromer solution of polyethyleneimine-ethylene oxide adduct obtained in Production Example 6, 21.7 g of a 48% aqueous solution of sodium hydroxide, 44.6 g of 3-mercaptopropionic acid and 287 g of distilled water were added dropwise over 5 hours, and 240 g of a 2.0% aqueous hydrogen peroxide solution and 240 g of an aquepus L-ascorbic acid solution were respectively added dropwise over 6 hours to the reaction vessel. Thereafter, the temperature was further maintained at 70° C. for 1 hour, and thereafter the polymerization reaction was finished, whereby, a polycarbocylic acid cement admixture with a weight average molecular weight of 10000 is obtained.

As shown in Table 2, a concrete test was carried out in the same conditions as described above by using the cement admixture solely or in the form of mixtures. The results are shown in Table 2.

TABLE 2

| Admixture (mixing ratio) | Amount of addition (% by mass) | Slump flow value (mm) | | | Water-reducing ability | Retaining ability | Concrete condition (point) |
| --- | --- | --- | --- | --- | --- | --- | --- |
| | | Immediately after mixing | 30 minutes later | 60 minutes later | | | |
| A-1 | 0.17 | 590 | 405 | 310 | ⊚ | Δ | 4 |
| A-1/B(30/70) | 0.275 | 520 | 450 | 410 | ○ | ○ | 4 |
| A-1/B/C (27/63/10) | 0.275 | 525 | 450 | 410 | ○ | ○ | 5 |
| B | 0.5 | 490 | 500 | 510 | X | ⊚ | 4 |
| A-1/D/E/C (27/44/19/10) | 0.28 | 510 | 470 | 430 | ○ | ○ | 5 |

In Table 2, "A-1" means Cement admixture (2) produced in Example B, "B" means Cement admixture produced in Production Example 4, "C" means polyethyleneimine-ethylene oxide adduct (compound obtained by addition of 20 moles, on average, of ethylene oxide to an active hydrogen atom of polyethyleneimine with Molecular Weight 600), "D" means Cement admixture produced in Production Example 5, "E" means Polycarboxylic acid cement admixture produced in Production Example 7. The mixing ratio of the admixtures is a mass ratio of the solid matter and the addition amount means the amount of the solid matters to cement on the basis of % by mass. The evaluation of the concrete condition was carried out as described above and the evaluation of the water-reducing ability and the retaining ability were carried out based on the following criteria:
⊚: Very good
○: Good
Δ: Fair inferior
X: Inferior As shown in Table 2, both in the cases where A-1 and B were used alone, the concrete conditions were sufficiently excellent. But in the case of A-1 alone, there still remained a space for improvement of the retaining ability of the slump flow, and in the case of B alone, there still remained a space for improvement of the water-reducing ability. However, mixing of them provided an admixture excellent in water-reducing ability and retaining ability without deteriorating the excellent concrete condition. Moreover, addition of C improved the concrete condition. Furthermore, addition of C, D and E to A-1 provided an admixture excellent in the water-reducing ability, the retaining ability, and the concrete condition.

EXAMPLES 1 to 27, Comparative Examples 1 to 7

With the monomers shown in Table 3, Polymers (1) to (21) having the composition ratios in Table 4 were obtained. The weight average molecular weights (Mw) of the respective polymers are shown in Table 4. By mixing these polymers or adducts shown in Table 3, the cement admixture composites of the present invention (Examples 1 to 27) and cement admixture composites for comparison (Comparative Examples 1 to 7) were obtained. The species of the polymers and adducts used and the mixing ratio thereof are shown in Table 5.

TABLE 3

| Monomer | Structural formula or explanation |
| --- | --- |
| Monomer (1) | $CH_2=C(CH_3)COO-(C_2H_4O)_{13}-(C_3H_6O)_2-(C_2H_4O)_{10}-CH_3$ |
| Monomer (2) | $CH_2=C(CH_3)COO-(C_2H_4O)_7-(C_3H_6O)_2-(C_2H_4O)_6-CH_3$ |
| Monomer (3) | $CH_2=C(CH_3)COO-(C_2H_4O)_{4.5}-(C_3H_6O)_{1.5}-(C_2H_4O)_4-CH_3$ |
| Monomer (4) | $CH_2=C(CH_3)CH_2CH_2-O-(C_2H_4O)_{26}-(C_3H_6O)_4-(C_2H_4O)_{20}-H$ |
| Monomer (5) | $CH_2=C(CH_3)COO-(C_2H_4O)_{25}-CH_3$ |
| Monomer (6) | $CH_2=C(CH_3)COO-(C_2H_4O)_{10}-CH_3$ |
| Monomer (7) | $CH_2=C(CH_3)COO-(C_2H_4O)_6-CH_3$ |
| Monomer (8) | $CH_2=C(CH_3)COO-(C_2H_4O)_4-CH_3$ |
| Monomer (9) | $CH_2=C(CH_3)CH_2CH_2-O-(C_2H_4O)_{50}-H$ |
| Monomer (10) | Methacrylic acid |
| Monomer (11) | Acrylic acid |
| Monomer (12) | Maleic acid |
| Monomer (13) | A compound obtained by addition of 1.5 moles of glycidyl methacrylate relative to 1 mole of a polyalkyleneimine-alkylene oxide adduct obtained by addition of 3 moles of ethylene oxide (EO) relative to 1 equivalent of active hydrogen atom (—NH) derived from en amino group of polyethyleneimine (Mw = 600) |
| Adduct (1) | A polyalkyleneimine-alkylene oxide adduct obtained by addition of 3 moles of ethylene oxide relative to 1 equivalent of active hydrogen atom (—NH) derived from an amino group of polyethyleneimine (Mw = 1800) |
| Adduct (2) | A polyalkyleneimine-alkylene oxide adduct obtained by addition of 20 moles of ethylene oxide relative to 1 equivalent of active hydrogen atom (—NH) derived from an amino group of polyethyleneimine (Mw = 600) |
| Adduct (3) | A polyalkyleneimine-alkylene oxide adduct obtained by addition of 10 moles of ethylene oxide, then 6 moles of propyrene oxide, and further 10 moles of ethylene oxide relative to 1 equivalent of active hydrogen atom (—NH) derived from an amino group of polyethyleneimine (Mw = 600) |
| Adduct (4) | A polyalkyleneimine-alkylene oxide adduct obtained by addition of 3 moles of ethylene oxide, then 6 moles of propyrene oxide, and further 80 moles of ethylene oxide relative to 1 |

TABLE 3-continued

| Monomer | Structural formula or explanation |
|---|---|
| | equivalent of active hydrogen atom (—NH) derived from an amino group of polyethyleneimine (Mw = 600) |

TABLE 4

| Polymer | Composition | | | Ratio (wt %) | | | Molecular weight |
|---|---|---|---|---|---|---|---|
| Polymer (1) | Monomer (1) | Monomer (10) | — | 75.0 | 25.0 | — | 14000 |
| Polymer (2) | Monomer (1) | Monomer (10) | Monomer (10) | 75.0 | 15.0 | 10.0 | 13600 |
| Polymer (3) | Monomer (1) | Monomer (10) | — | 90.5 | 9.5 | — | 21300 |
| Polymer (4) | Monomer (1) | Monomer (10) | — | 90.5 | 9.5 | — | 35800 |
| Polymer (5) | Monomer (1) | Monomer (10) | — | 92.5 | 7.5 | — | 40500 |
| Polymer (6) | Monomer (2) | Monomer (10) | — | 87.5 | 12.5 | — | 22000 |
| Polymer (7) | Monomer (2) | Monomer (10) | — | 87.5 | 12.5 | — | 17000 |
| Polymer (8) | Monomer (3) | Monomer (10) | — | 85.0 | 15.0 | — | 22000 |
| Polymer (9) | Monomer (3) | Monomer (10) | — | 85.0 | 15.0 | — | 17000 |
| Polymer (10) | Monomer (4) | Monomer (11) | — | 85.0 | 15.0 | — | 38000 |
| Polymer (11) | Monomer (4) | Monomer (11) | — | 92.7 | 7.5 | — | 35000 |
| Polymer (12) | Monomer (4) | Monomer (10) | — | 87.5 | 12.5 | — | 30000 |
| Polymer (13) | Monomer (5) | Monomer (10) | — | 80.0 | 20.0 | — | 22000 |
| Polymer (14) | Monomer (5) | Monomer (10) | — | 87.5 | 12.5 | — | 20000 |
| Polymer (15) | Monomer (5) | Monomer (10) | — | 90.5 | 9.5 | — | 37000 |
| Polymer (16) | Monomer (6) | Monomer (10) | — | 75.0 | 25.0 | — | 20000 |
| Polymer (17) | Monomer (7) | Monomer (10) | — | 75.0 | 25.0 | — | 8500 |
| Polymer (18) | Monomer (8) | Monomer (10) | Monomer (13) | 60.0 | 20.0 | 20.0 | 9000 |
| Polymer (19) | Monomer (9) | Monomer (11) | — | 85.0 | 15.0 | — | 38000 |
| Polymer (20) | Monomer (9) | Monomer (11) | — | 92.7 | 7.5 | — | 35000 |
| Polymer (21) | Monomer (9) | Monomer (12) | — | 87.5 | 12.5 | — | 30000 |

In Table 4, "wt %" represents "% by mass".

TABLE 5

| | Species of polymer and adduct | | | | Mixing ratio (wt %) | | | |
|---|---|---|---|---|---|---|---|---|
| | Polymer A | Polymer B | Polymer C | Adduct | Polymer A | Polymer B | Polymer C | Adduct |
| Example 1 | Polymer (1) | Polymer (3) | — | — | 30 | 70 | — | — |
| Example 2 | Polymer (1) | Polymer (4) | — | — | 30 | 70 | — | — |
| Example 3 | Polymer (1) | Polymer (4) | — | — | 20 | 80 | — | — |
| Example 4 | Polymer (1) | Polymer (5) | — | — | 30 | 70 | — | — |
| Example 5 | Polymer (1) | Polymer (3) | — | Adduct (2) | 30 | 60 | — | 10 |
| Example 6 | Polymer (1) | Polymer (3) | — | Adduct (3) | 30 | 60 | — | 10 |
| Example 7 | Polymer (1) | Polymer (3) | — | Adduct (4) | 30 | 60 | — | 10 |
| Example 8 | Polymer (2) | Polymer (5) | — | — | 30 | 70 | — | — |
| Example 9 | Polymer (1) | Polymer (17) | Polymer (18) | Adduct (1) | 23 | 47 | 15 | 15 |
| Example 10 | Polymer (1) | Polymer (17) | Polymer (18) | Adduct (3) | 23 | 47 | 15 | 15 |
| Example 11 | Polymer (1) | Polymer (17) | Polymer (18) | Adduct (4) | 23 | 47 | 15 | 15 |
| Example 12 | Polymer (1) | Polymer (17) | Polymer (6) | Adduct (4) | 23 | 47 | 15 | 15 |
| Example 13 | Polymer (13) | Polymer (17) | Polymer (6) | Adduct (4) | 23 | 47 | 15 | 15 |
| Example 14 | Polymer (1) | Polymer (7) | — | Adduct (4) | 30 | 60 | — | 10 |
| Example 15 | Polymer (13) | Polymer (7) | — | Adduct (4) | 30 | 60 | — | 10 |
| Example 16 | Polymer (1) | Polymer (17) | — | Adduct (4) | 10 | 80 | — | 10 |
| Example 17 | Polymer (1) | Polymer (17) | — | — | 20 | 80 | — | — |
| Example 18 | Polymer (1) | Polymer (7) | — | Adduct (3) | 30 | 60 | — | 10 |
| Example 19 | Polymer (1) | Polymer (8) | — | — | 30 | 70 | — | — |
| Example 20 | Polymer (1) | Polymer (9) | — | — | 30 | 70 | — | — |
| Example 21 | Polymer (16) | Polymer (9) | — | — | 30 | 70 | — | — |
| Example 22 | Polymer (16) | Polymer (9) | — | Adduct (4) | 30 | 60 | — | 10 |
| Example 23 | Polymer (10) | Polymer (7) | — | — | 20 | 80 | — | — |
| Example 24 | Polymer (10) | Polymer (17) | — | — | 20 | 80 | — | — |
| Example 25 | Polymer (11) | Polymer (7) | — | — | 30 | 70 | — | — |
| Example 26 | Polymer (12) | Polymer (7) | — | — | 20 | 80 | — | — |
| Example 27 | Polymer (12) | Polymer (17) | — | — | 20 | 80 | — | — |
| Compar. Ex. 1 | Polymer (13) | Polymer (14) | — | — | 30 | 70 | — | — |
| Compar. Ex. 2 | Polymer (13) | Polymer (15) | — | — | 40 | 60 | — | — |
| Compar. Ex. 3 | Polymer (16) | Polymer (17) | Polymer (18) | Adduct (1) | 23 | 47 | 15 | 15 |
| Compar. Ex. 4 | Polymer (13) | Polymer (17) | Polymer (18) | Adduct (2) | 23 | 47 | 15 | 15 |
| Compar. Ex. 5 | Polymer (13) | Polymer (17) | — | Adduct (2) | 10 | 80 | — | 10 |
| Compar. Ex. 6 | Polymer (19) | Polymer (14) | — | — | 20 | 80 | — | — |
| Compar. Ex. 7 | Polymer (20) | Polymer (14) | — | — | 30 | 70 | — | — |

In Table 5, "wt %" represents "% by mass".

<Concrete Test>

With the cement admixtures shown in Examples 1 to 27 and Comparative Examples 1 to 7, concretes were prepared and the respective properties were evaluated for each concrete. The concrete formulation followed the ratio shown in Table 6 below.

TABLE 6

| W/C (% by mass) | Ratio of fine aggregate (% by volume) | Mixing unit amount (kg/m³) | | | | |
|---|---|---|---|---|---|---|
| | | Air | Water | Cement | Coarse aggregate | Fine aggregate |
| 45 | 48.1 | 45 | 172.0 | 382.2 | 909.8 | 835.1 |
| 30 | 42.9 | 45 | 172.0 | 573.3 | 909.8 | 676.6 |

The descriptions in Table 6 are as follows.
W/C (% by mass): water/cement × 100
Ratio of fine aggregate (% by volume): Amount of fine aggregates/(coarse aggregates + fine aggregates) × 100
Cement: mixing three species of ordinary portalnd cements, produced by Taiheiyo Cement, Sumitomo Osaka Cement and Ube Mitsubishi Cement
Coarse aggregate: lime crushed stone produced in Hachinohe, Aomori prefecture
Fine aggregate: pit sand produced in Chiba prefecture With the above-mentioned formulation, the concretes were mixed by using a pan forced action mixer (rotation 40 rpm: content 50 L) The mixing method was as follows, and 30 liter of concrete was mixed up per batch.

W/C 45 (in the case where W/C is 45% by mass): Coarse aggregates, fine aggregates and cement were charged at once, and the mixture was conducted to dry mixing for 10 seconds. Then, water mixed with the cement admixture was added thereto to carry out mixing for 90 seconds to produce a concrete.

W/C 30 (in the case where W/C is 30% by mass): Fine aggregates and cement were charged at once, and the mixture was conducted to dry mixing for 10 seconds. Then, water mixed with the cement admixture was added thereto to carry out mixing for 60 seconds. Furthermore, coarse aggregates were charged thereto, and the mixture was mixed for 60 seconds to produce a concrete.

The results in the case of W/C being 45% by mass are shown in Table 7, and the results in the case of W/C being 30% by mass are shown in Table 8, respectively.

TABLE 7

(W/C = 45%)

| | *1 Additive wt % | *2 Anti-foaming agent wt % | *3 AE agent wt % | Slump flow value | | | 4* Slump flow decreasing ratio % | Initial air amount vol % | *5 Compressive strength N/mm² | *6 Water-reducing ability | *7 Slump-retaining ability | *8 Condition | *9 Compressive strength |
|---|---|---|---|---|---|---|---|---|---|---|---|---|---|
| | | | | Initial stage mm | 30 minutes later mm | 60 minutes later mm | | | | | | | |
| Example 1 | 0.18 | 0.007 | 0.01 | 430 | 405 | 375 | −12.8 | 4.2 | 48.6 | ○ | ◎ | ○ | ○ |
| Example 2 | 0.16 | 0.007 | 0.01 | 405 | 355 | 325 | −19.8 | 4.6 | 49.1 | ◎ | ○ | ○ | ○ |
| Example 3 | 0.16 | 0.005 | 0.01 | 425 | 415 | 355 | −16.5 | 4.9 | 49.7 | ◎ | ○ | ○~Δ | ○ |
| Example 4 | 0.19 | 0.005 | 0.01 | 400 | 370 | 355 | −11.3 | 4.5 | 48.8 | Δ | ◎ | ○~Δ | ○ |
| Example 5 | 0.16 | 0.005 | 0.01 | 410 | 375 | 340 | −17.1 | 4.0 | 48.6 | ○ | ○ | ○~Δ | ○ |
| Example 6 | 0.17 | 0.007 | 0.01 | 405 | 385 | 350 | −13.6 | 4.1 | 50.4 | ○ | ◎ | ○ | ○ |
| Example 7 | 0.17 | 0.007 | 0.01 | 410 | 395 | 355 | −13.4 | 3.9 | 51.3 | ○ | ◎ | ○ | ○ |
| Example 8 | 0.16 | 0.005 | 0.01 | 410 | 360 | 330 | −19.5 | 4.5 | 50.9 | ○ | ○ | ○ | ○ |
| Example 9 | 0.18 | 0 | 0.001 | 420 | 350 | 335 | −20.2 | 4.2 | 46.8 | ○ | Δ | ○ | ○ |
| Example 10 | 0.17 | 0 | 0.001 | 400 | 360 | 330 | −17.5 | 4.8 | 49.5 | ○ | ○ | ○ | ○ |
| Example 11 | 0.17 | 0 | 0.001 | 415 | 370 | 340 | −18.1 | 4.6 | 50.0 | ○ | ○ | ○ | ○ |
| Example 12 | 0.16 | 0 | 0.001 | 385 | 335 | 305 | −20.8 | 4.4 | 51.3 | ◎ | Δ | ○ | ○ |
| Example 13 | 0.16 | 0 | 0.001 | 390 | 345 | 310 | −20.5 | 4.7 | 51.8 | ◎ | Δ | ○~Δ | ○ |
| Example 14 | 0.17 | 0 | 0 | 430 | 390 | 340 | −20.9 | 4.3 | 53.1 | ○ | Δ | ○ | ◎ |
| Example 15 | 0.16 | 0 | 0 | 415 | 370 | 330 | −20.5 | 4.5 | 54.0 | ◎ | Δ | ○~Δ | ◎ |
| Example 16 | 0.17 | 0 | 0 | 395 | 365 | 330 | −16.5 | 5.0 | 48.6 | ○ | ○ | ○ | ○ |
| Example 17 | 0.17 | 0 | 0 | 395 | 345 | 320 | −19.0 | 5.1 | 47.3 | ○ | ○ | ○ | ○ |
| Example 18 | 0.18 | 0 | 0.001 | 405 | 385 | 345 | −14.8 | 4.7 | 49.7 | ○ | ◎ | ○ | ○ |
| Example 19 | 0.18 | 0 | 0.001 | 420 | 375 | 340 | −19.0 | 4.5 | 48.4 | ○ | ○ | ○ | ○ |
| Example 20 | 0.18 | 0 | 0.002 | 405 | 370 | 330 | −18.5 | 4.2 | 47.9 | ○ | ○ | ○ | ○ |
| Example 21 | 0.18 | 0 | 0.002 | 410 | 380 | 350 | −14.6 | 4.4 | 47.3 | ○ | ◎ | ○ | ○ |
| Example 22 | 0.17 | 0 | 0.002 | 410 | 375 | 335 | −18.3 | 4.7 | 47.9 | ○ | ○ | ○ | ○ |
| Example 23 | 0.14 | 0 | 0.003 | 405 | 365 | 325 | −19.8 | 4.2 | 49.5 | ◎ | ○ | ○ | ○ |
| Example 24 | 0.13 | 0 | 0.004 | 395 | 360 | 310 | −21.5 | 4.5 | 48.2 | ○ | Δ | ○ | ○ |
| Example 25 | 0.15 | 0 | 0.003 | 415 | 380 | 335 | −19.3 | 4.0 | 48.6 | ○ | ○ | ○ | ○ |
| Example 26 | 0.16 | 0 | 0.004 | 405 | 365 | 330 | −18.5 | 3.8 | 48.2 | ○ | ○ | ○ | ○ |
| Example 27 | 0.15 | 0 | 0.003 | 405 | 350 | 315 | −22.2 | 4.3 | 47.7 | ○ | Δ | ○ | ○ |
| Compar. Ex. 1 | 0.16 | 0 | 0.002 | 410 | 350 | 305 | −25.6 | 5.1 | 45.9 | ○ | X | X | Δ |
| Compar. Ex. 2 | 0.18 | 0 | 0.002 | 405 | 365 | 320 | −21.0 | 4.8 | 45.9 | Δ | Δ | X | Δ |
| Compar. Ex. 3 | 0.18 | 0 | 0.001 | 420 | 340 | 325 | −22.6 | 4.4 | 45.0 | Δ | Δ | Δ~X | Δ |
| Compar. Ex. 4 | 0.17 | 0 | 0.001 | 410 | 345 | 305 | −25.6 | 4.7 | 46.4 | ○ | X | X | Δ |
| Compar. Ex. 5 | 0.16 | 0 | 0.002 | 405 | 320 | 295 | −27.2 | 4.2 | 45.6 | ○ | X | X | Δ |

TABLE 7-continued (W/C = 45%)

|  | *1 Additive wt % | *2 Anti- foaming agent wt % | *3 AE agent wt % | Slump flow value | | | 4* Slump flow decreasing ratio % | Initial air amount vol % | *5 Compressive strength N/mm² | Evaluation items | | | |
|---|---|---|---|---|---|---|---|---|---|---|---|---|---|
|  |  |  |  | Initial stage mm | 30 minutes later mm | 60 minutes later mm |  |  |  | *6 Water- reducing ability | *7 Slump- retaining ability | *8 Con- dition | *9 Com- pressive strength |
| Compar. Ex. 6 | 0.16 | 0 | 0.002 | 390 | 310 | 270 | −30.8 | 4.6 | 45.9 | ○ | X | X | Δ |
| Compar. Ex. 7 | 0.16 | 0 | 0.002 | 395 | 300 | 260 | −34.2 | 4.5 | 46.4 | ○ | X | X | Δ |

The descriptions in Table 7 are as follows.
"wt %" represents mass ratio of solids relative to 100% by mass of a cement solid.
Slump flow value in Table 7 and Table 8 are measured by the following method:
Freshly-mixed concrete (ready-mixed concrete) obtained by the above-mentioned method for producing concrete was remixed at 2 round-trip by a scoop, and then measured slump flow value: the slump flow value was defined as the initial stage-value.Furthermore, the concrete was remixed at 2 round-trip by a scoop after 30 minutes and 60 minutes from the start of mixing (just before the start of mixing with adding mixing-water), and then measured slumpflow value: the slump flow value were respectively defined as the 30 minites later-value and the 60 minites later-value.
*1 Total amount after mixing of Polymers A, B, C and adducts
*2 Antifoaming agent manufactured by NMB Company (trademark: MICROAIR 404) was used
*3 AE agent manufactured by NMB Company (trademark: MICROAIR 303) was used
*4 Caluculated by the following formula
(Slump flow value after the lapse of 60 minutes) − (the initial slump flow value)}/the initial slump flow value
*5 Compressive strength mesurement values after curing in water for 7 days; measurements were carried out according to JIS A1108
*6 Evaluated as follows according to the used amount of the additive (*1)
◎: not more than 0.16% by mass
○: more than 0.16% by mass and not more than 0.18% by mass
Δ: more than 0.18% by mass and not more than 0.22% by mass
X: more than 0.22% by mass
*7 Evaluated as follows by the slump flow decreasing ratio (*4)
◎: not more than −15%
○: more than −15% and not more than −20%
Δ: more than −20% and not more than −25%
X: more than −25%
*8 Concrete conditions
○: Resistance is small when mixed; a light and smooth concrete
Δ: Intermediate between ○ and X
X: Resistance is large when mixed; a heavy and viscous concrete
*9 Evaluated as follows by the compressive strength (*5)
◎: not less than 52 (N/mm²)
○: not less than 47 (N/mm²)
Δ: less than 47 (N/mm²)

TABLE 8

(W/C = 30%)

|  | *1 Additive wt % | *2 Antifoaming agent wt % | *3 AE agent wt % | Slump-flow value | | | *4 Slump flow decreasing ratio % | Initial air amount vol % | Evaluation items | | |
|---|---|---|---|---|---|---|---|---|---|---|---|
|  |  |  |  | Initial stage mm | 30 minutes later mm | 60 minutes later mm |  |  | *5 Water- reducing ability | *6 Slump- retaining ability | *7 Condition |
| Example 1 | 0.38 | 0.003 | 0.005 | 605 | 580 | 520 | −14.0 | 5.1 | Δ | Δ | ○ |
| Example 2 | 0.35 | 0.003 | 0.005 | 610 | 565 | 525 | −13.9 | 4.6 | ○ | Δ | ○ |
| Example 3 | 0.37 | 0.003 | 0.005 | 600 | 585 | 580 | −6.7 | 4.8 | Δ | ○ | ○~Δ |
| Example 4 | 0.40 | 0.004 | 0.005 | 600 | 595 | 575 | −4.2 | 4.8 | Δ | ◎ | ○~Δ |
| Example 5 | 0.34 | 0.002 | 0.005 | 590 | 575 | 515 | −12.7 | 5.1 | ○ | ○ | ○~Δ |
| Example 6 | 0.36 | 0.003 | 0.005 | 610 | 600 | 580 | −4.9 | 5.1 | Δ | ◎ | ○ |
| Example 7 | 0.34 | 0.003 | 0.005 | 600 | 555 | 520 | −13.3 | 4.5 | ○ | Δ | ○ |
| Example 8 | 0.37 | 0 | 0.004 | 605 | 585 | 550 | −9.1 | 4.5 | Δ | ○ | ○ |
| Example 9 | 0.38 | 0 | 0.003 | 615 | 640 | 595 | −3.3 | 4.5 | Δ | ◎ | ○ |
| Example 10 | 0.36 | 0 | 0.003 | 605 | 620 | 580 | −4.1 | 4.2 | Δ | ◎ | ○ |
| Example 11 | 0.35 | 0 | 0.004 | 595 | 605 | 565 | −5.0 | 4.2 | ○ | ◎ | ○ |
| Example 12 | 0.33 | 0 | 0.003 | 595 | 590 | 545 | −8.4 | 4.5 | ○ | ○ | ○ |
| Example 13 | 0.32 | 0 | 0.003 | 605 | 595 | 540 | −10.7 | 4.1 | ○ | Δ | ○~Δ |
| Example 14 | 0.39 | 0 | 0.007 | 570 | 540 | 490 | −14.0 | 3.9 | Δ | Δ | ○ |
| Example 15 | 0.37 | 0 | 0.007 | 585 | 525 | 500 | −14.5 | 4.9 | Δ | Δ | ○~Δ |
| Example 16 | 0.32 | 0 | 0.003 | 615 | 656 | 645 | 4.9 | 4.6 | ○ | ◎ | ○ |
| Example 17 | 0.33 | 0 | 0.002 | 605 | 610 | 590 | −2.5 | 4.3 | ○ | ◎ | ○ |
| Example 18 | 0.39 | 0 | 0.002 | 595 | 565 | 540 | −9.2 | 5.2 | Δ | ○ | ○ |
| Example 19 | 0.37 | 0 | 0.001 | 600 | 580 | 550 | −8.3 | 5.0 | Δ | ○ | ○ |
| Example 20 | 0.37 | 0 | 0.002 | 605 | 590 | 555 | −8.3 | 4.6 | Δ | ○ | ○ |
| Example 21 | 0.37 | 0 | 0.001 | 590 | 575 | 550 | −6.8 | 4.7 | Δ | ○ | ○ |
| Example 22 | 0.35 | 0 | 0.001 | 615 | 585 | 555 | −9.8 | 4.8 | ○ | ○ | ○ |

TABLE 8-continued (W/C = 30%)

| | *1 Additive wt % | *2 Antifoaming agent wt % | *3 AE agent wt % | Slump-flow value | | | *4 Slump flow decreasing ratio % | Initial air amount vol % | Evaluation items | | |
| --- | --- | --- | --- | --- | --- | --- | --- | --- | --- | --- | --- |
| | | | | Initial stage mm | 30 minutes later mm | 60 minutes later mm | | | *5 Water-reducing ability | *6 Slump-retaining ability | *7 Condition |
| Example 23 | 0.32 | 0 | 0.005 | 600 | 570 | 535 | −10.8 | 4.5 | ○ | Δ | ○ |
| Example 24 | 0.30 | 0 | 0.005 | 610 | 560 | 530 | −13.1 | 4.3 | ○ | Δ | ○ |
| Example 25 | 0.38 | 0 | 0.003 | 595 | 570 | 540 | −9.2 | 4.1 | ○ | ○ | ○ |
| Example 26 | 0.35 | 0 | 0.003 | 600 | 575 | 525 | −12.5 | 4.6 | ○ | Δ | ○ |
| Example 27 | 0.33 | 0 | 0.003 | 605 | 550 | 515 | −14.9 | 5.1 | ○ | Δ | ○ |
| Compar. Ex. 1 | 0.32 | 0 | 0.003 | 605 | 575 | 525 | −13.2 | 4.8 | ○ | Δ | X |
| Compar. Ex. 2 | 0.42 | 0 | 0.003 | 620 | 585 | 545 | −12.1 | 4.6 | X | Δ | X |
| Compar. Ex. 3 | 0.42 | 0 | 0.003 | 615 | 685 | 665 | −8.1 | 4.5 | Δ | ◎ | Δ~X |
| Compar. Ex. 4 | 0.37 | 0 | 0.003 | 610 | 605 | 555 | −9.0 | 4.3 | Δ | ○ | X |
| Compar. Ex. 5 | 0.33 | 0 | 0.003 | 585 | 520 | 465 | −20.5 | 4.9 | ○ | X | X |
| Compar. Ex. 6 | 0.32 | 0 | 0.003 | 605 | 565 | 520 | −14.0 | 4.2 | ○ | Δ | X |
| Compar. Ex. 7 | 0.32 | 0 | 0.003 | 600 | 550 | 505 | −15.8 | 3.9 | ○ | X | X |

The descriptions in Table 8 are as follows.
"wt %" represents mass ratio of solids relative to 100% by mass of a cement solid.
*1 Total amount after mixing of Polymers A, B, C and adducts
*2 Antifoaming agent manufactured by NMB Company (trademark: MICROAIR 404) was used
*3 AE agent manufactured by NMB Company (trademark: MICROAIR 303) was used
*4 Caluculated by the following formula
(Slump flow value after the lapse of 60 minutes) − (the initial slump flow value)}/the initial slump flow value
*5 Evaluated as follows according to the used amount of the additive (*1)
◎: not more than 0.30% by mass
○: more than 0.30% by mass and not more than 0.35% by mass
Δ: more than 0.35% by mass and not more than 0.40% by mass
X: more than 0.40% by mass
*6 Evaluated as follows by the slump flow decreasing ratio (*4)
◎: not more than −5%
○: more than −5% and not more than −10%
Δ: more than −10% and not more than −15%
X: more than −15%
*7 Concrete conditions
○: Resistance is small when mixed; a light and smooth concrete
Δ: Intermediate between ○ and X
X: Resistance is large when mixed; a heavy and viscous concrete As shown in Table 7, in the formulation condition of W/C=45% by mass, it was found that rather than the case in which one species of polymer introduced with a PPG (polypropyrene glycol) skeleton is mixed, the case in which two species of the polymers are mixed is superior in the condition and slump-retaining ability, and especially the compressive strength was found being improved by 3 to 15%. Additionally, the mole ratio of PO (propyrene oxide) in one species of the polymer is especially preferably 8 to 15 mole %. On the other hand, as shown in Table 8, in the formulation condition of W/C=30% by mass, it was found that water-reducing ability was superior when one species of polymer introduced with a PPG skeleton is mixed. When two species of polymers are mixed, the addition amount tends to increase. The PO mole ratio in one species of the polymer is preferably 8 to 15 mole %.

Moreover, Comparative Examples 1 to 7 are the embodiments in which polymers without being introduced with a PPG skeleton are combinedly used, but it is clear that, as compared with Examples, they are poor in conditions and are not provided with the strength.

As regards a correspondence of Examples and Comparative Examples, Examples 1 to 4 correspond to Comparative Examples 1 and 2, Examples 9 to 12 correspond to Comparative Examples 3 and 4, Examples 14 to 22 correspond to Comparative Examples 1, 2 and 5, Examples 23 to 25 correspond to Comparative Example 6, and Examples 26 and 27 correspond to Comparative Example 7, respectively.

The present application claims priority under 35 U.S.C. §119 to Japanese Patent Application No. 2003-128594, filed May 7, 2003, entitled "CEMENT ADMIXTURE", Japanese Patent Application No. 2003-346161, filed Oct. 3, 2003, entitled "CEMENT ADMIXTURE AND CEMENT ADMIXTURE COMPOSITE". The contents of these applications are incorporated herein by reference in their entirety.

The invention claimed is:

1. A cement admixture comprising a polycarboxylic acid polymer,
wherein said polycarboxylic acid polymer has a site represented by the following formula (1):

(1)

wherein $R^1$ and $R^2$ may be the same or different and each represents a hydrogen atom or a methyl group; $R^3$ may be the same or different and represents an alkylene group containing 3 to 18 carbon atoms; x represents a number of 0 to 2; y represents 0 or 1; n and k represent an average molar number of addition of an oxyethylene group, in which n is a number of 1 to 200 and k is a number of 1 to 200; m represents an average molar number of addition of the oxyalkylene group and is a number of 1 to 50; n+m+k is a number of 3 to 200; and $R^4$ represents a hydrogen atom or a hydrocarbon group containing 1 to 20 carbon atoms.

2. A cement admixture composite comprising two or more species of cement admixtures, wherein at least one of the two or more species of cement admixtures is the cement admixture according to claim 1.

3. The cement admixture composite according to claim 2, wherein the cement admixture comprises at least one species of polymer selected from the group consisting of a polymer having a site represented by the following formula (4):

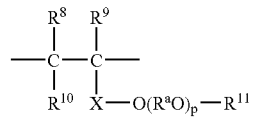

(4)

wherein $R^8$, $R^9$ and $R^{10}$ may be the same or different and each represents a hydrogen atom or a methyl group; $R^{11}$ represents a hydrogen atom or a hydrocarbon group containing 1 to 30 carbon atoms; $R^a$ may be the same or different and represents an alkylene group containing 2 to 18 carbon atoms; p represents an average molar number of addition of the oxyalkylene group and is a number of 1 to 300; X represents a divalent alkylene group containing 1 to 5 carbon atoms, a —CO— bond, an —$R^b$—CO— bond, or a direct bond; and $R^b$ represents a divalent alkylene group containing 1 to 5 carbon atoms, a polymer having a nitrogen atom, and a polymer containing a branched structure and an oxyalkylene group.

* * * * *